United States Patent [19]
Jain et al.

[11] Patent Number: 5,633,859
[45] Date of Patent: May 27, 1997

[54] METHOD AND APPARATUS FOR CONGESTION MANAGEMENT IN COMPUTER NETWORKS USING EXPLICIT RATE INDICATION

[75] Inventors: Raj Jain, Upper Arlington; Shiv Kalyanaraman; Ram Viswanathan, both of Columbus, all of Ohio

[73] Assignee: The Ohio State University, Columbus, Ohio

[21] Appl. No.: 307,375

[22] Filed: Sep. 16, 1994

[51] Int. Cl.$^6$ .................................................. H04Q 11/04
[52] U.S. Cl. ............................................ 370/234; 370/236
[58] Field of Search ............................. 370/84, 17, 58.2, 370/58.3, 68.1, 58.1, 60, 60.1, 94.1, 110.1

[56] References Cited

U.S. PATENT DOCUMENTS

| | | | |
|---|---|---|---|
| 4,769,811 | 9/1988 | Eckberg, Jr. | 370/60 |
| 4,849,968 | 7/1989 | Turner | 370/94 |
| 5,193,151 | 3/1993 | Jain | 395/200 |

OTHER PUBLICATIONS

"Congestion Avoidance in Computer Networks with a Connectionless Network Layer Part IV: A Selective Binary"; Digital Equipment Corporation; K. K. Ramakrishnan et al.; ©Aug., 1987.

"Congestion Avoidance in Computer Networks with a Connectionless Network Layer"; Digital Equipment Corporation; R. Jain et al.; ©Oct., 1987.

"A Delay–Based Approach for Congestion Avoidance in Interconnected Heterogeneous Computer Networks"; Digital Equipment Corporation; R. Jain; ©Apr., 1989.

"Congestion Control in Computer Networks: Issues and Trends"; *IEEE Network Magazine*; R. Jain; ©May, 1990.

"Myths About Congestion Management in High–Speed Networks"; Digital Equipment Corporation; R. Jain; ©1992.

"Congestion Control with Explicit Rate Indication"; ATM Forum Technical Working Group Members; ATM Document No. 94–0692; R. Jain et al.; Jul., 1994.

*Primary Examiner*—Douglas W. Olms
*Assistant Examiner*—Matthew C. Phillips
*Attorney, Agent, or Firm*—Fay, Sharpe, Beall, Fagan, Minnich & McKee

[57] ABSTRACT

An explicit rate indication method for congestion management in computer and telecommunication networks. Sources monitor their load and provide the information periodically to switches. The switches, in turn, compute the load level and ask the sources to adjust their rates up or down. The scheme achieves high link utilization, fair allocation of rates among contending sources and provides quick convergence.

36 Claims, 15 Drawing Sheets

METHOD AND APPARATUS FOR CONGESTION MANAGEMENT IN COMPUTER NETWORKS USING EXPLICIT RATE INDICATION

BACKGROUND OF THE INVENTION

This invention relates to the method and apparatus for congestion management in computer networks using explicit rate indication. More particularly, the invention is directed to a method wherein sources monitor their load and provide information periodically to switches. The switches, in turn, compute the actual load level and ask the sources to adjust their rates up or down.

While the invention is particularly directed to the art of data congestion management, and will thus be described with specific reference thereto, it will be appreciated that the invention may have usefulness in other fields and applications.

The next generation of computer and telecommunication networks will likely use the asynchronous transfer mode (ATM). ATM networks are connection-oriented networks in which the information is transmitted using fixed size 53-byte cells. The cells flow along predetermined paths called virtual channels (VCs). End systems set up constant bit rate (CBR) or variable bit rate (VBR) virtual channels (VCs) before transmitting information. For data traffic, which is highly "bursty" and does not have strict delay requirements, it is best to dynamically divide all available bandwidth fairly among VCs that need it at any moment of time. Such traffic is called available bit rate (ABR) traffic.

The main problem in supporting ABR traffic is that it is possible that more traffic may enter a switch then can exit and the switches can get congested. To control congestion, the switches typically notify the sources to reduce the traffic rate using a feedback mechanism. Known feedback techniques use a single bit having two values, 0 or 1, representing increase or decrease, respectively. The feedback step may require several executions before the sources adjust to the desired rate. An alternative technique for connection-oriented networks comprises the sending of a control cell from the switches to the source containing the desired rate.

Any time the total demand for a resource is more than the available resource, the problem of congestion arises. The bandwidth, buffers, and computational capacity are examples of resources in a network. The design goal of most network resource management algorithms is to provide maximum link bandwidth utilization while minimizing the buffers (queue length) and computation overhead.

In known congestion management schemes three performance measures most commonly used are efficiency, delay, and fairness. The desired optimal operation of congestion management methods are explained below, as well as the known methods themselves.

For clarification, each virtual circuit has one source and one destination and passes through a number of switches. The terms "source" and "virtual circuit" (VC) are used interchangeably herein. The term "host" is used to denote an end system, which may have several VCs.

One of the first requirements for good performance is efficiency, or high throughput. In a shared environment, the throughput for a source depends upon the demands by other sources. The most commonly used criterion for what is the correct share of bandwidth for a source in a network environment is the so called "max-min allocation." It provides the maximum allocation possible to the source receiving the least among all contending sources. Mathematically, it is defined as follows.

Given a configuration with n contending sources, suppose the ith source gets a bandwidth $x_i$. The allocation vector $\{x_1, x_2, \ldots, x_n\}$ is feasible if all link load levels are less than or equal to 100%. The total number of feasible vectors is infinite. Given any allocation vector, the source that is getting the least allocation is in some sense, the "unhappiest source." Given the set of all feasible vectors, find the vector that gives the maximum allocation to this unhappiest source. Actually, the number of such vectors is also infinite although we have narrowed down the search region considerably. Now we take this "unhappiest source" out and reduce the problem to that of remaining n−1 sources operating on a network with reduced link capacities. Again, we find the unhappiest source among these n−1 sources, give that source the maximum allocation and reduce the problem by one source. We keep repeating this process until all sources have been given the maximum possible bandwidth.

The following example illustrates that above concept of max-min fairness. FIG. 1 shows a network with three switches connected via two 150 Mbps links. Four VCs are setup such that the first link L1 is shared by sources S1, S2 and S3. The second link is shared by S3 and S4. Let us divide the link bandwidths fairly among contending sources. On link L1, we can give 50 Mbps to each of the three contending sources S1, S2 and S3. On link L2, we would give 75 Mbps to each of the sources S3 and S4. However, source S3 cannot use its 75 Mbps share at link L2 since it is allowed to use only 50 Mbps at link L1. Therefore, we give 50 Mbps to source S3 and construct a new configuration shown in FIG. 2, where Source S3 has been removed and the link capacities have been reduced accordingly. Now we give ½ of the link L1's remaining capacity to each of the two contending sources: S1 and S2; each gets 50 Mbps. Source S4 gets the entire remaining bandwidth (100 Mbps) of link L2. Thus, the fair allocation vector for this configuration is (50, 50, 50, 100). This is the max-min allocation.

Notice that max-min allocation is both fair and efficient. It is fair in the sense that all sources get an equal share on every link provided that they can use it. It is efficient in the sense that each link is utilized to the maximum load possible.

The max-min allocation is the desired goal. Any scheme that results in max-min allocation is called max-min fair. If a scheme gives an allocation that is different from the max-min allocation, its unfairness is quantified as follows.

Suppose a scheme allocates $\{\tilde{x}_1, \tilde{x}_2, \ldots, \tilde{x}_n\}$ instead of the max-min allocation $\{\hat{x}_1, \hat{x}_2, \ldots, \hat{x}_n\}$. Then, we calculate the normalized allocations $x_i = \tilde{x}_i/\hat{x}_i$ for each source and compute the fairness index as follows:

$$\text{Fairness} = \frac{\left(\sum_i x_i\right)^2}{n \sum_i x_i^2}$$

Since allocations $x_i$'s usually vary with time, the fairness can be plotted as a function of time. Alternatively, throughputs over a given interval can be used to compute overall fairness.

The efficiency of a scheme relates to its making full use of its resources. A scheme that results in underload or overload is considered inefficient. Given a network, it is the bottleneck link (the link with maximum utilization) whose proper loading is important. Thus, an efficient scheme tries to control sources such that the bottleneck link is neither underloaded nor overloaded.

Given two schemes with the same fairness and efficiency, one with lower end-to-end delay is preferred. Generally, there is a tradeoff between efficiency and delay in the sense that if one tries to use a link to 100% capacity, the queue lengths may become too large and the delays may become excessive. While data traffic is generally delay insensitive, extremely large delays are harmful since they may result in timeouts at higher layers and result in unnecessary retransmissions. Therefore, it is often preferable to keep link utilizations below 90–95%.

Most practical schemes take some time to reach fair and efficient operating point. Given two schemes with the same fairness and efficiency at the end of simulation, one which achieves efficiency and fairness faster is preferred. This preference is used to compare different design alternatives. Given the same starting point, the time taken to reach steady state is compared and the alternative producing faster convergence is selected. The steady state is defined informally as a small region around the final operating point. With deterministic simulations, it is relatively easy to identify the steady state since the system starts to oscillate around the final point.

The problem of congestion control and/or management has been known to be the critical part of network architecture design for several decades and hundreds of papers have been written on various schemes. Rather than provide a background survey of all schemes, selected schemes that are (or were) leading candidates for adoption in ATM networks will be considered. However, the present invention is equally adaptable to non-ATM networks.

At the ATM Forum, which is an organization of over 400 computer and telecommunication equipment manufacturers, the traffic management subgroup is responsible for uncovering the most desirable congestion control scheme. In particular, the congestion control for the so called "available bit rate (ABR)" traffic has been given special consideration since approximately May, 1993. By September of 1993, two distinct approaches emerged: The credit based scheme and the rate based scheme.

The credit-based approach consists of using window (or credit) based flow control on every link. Each node (switch or the source) keeps a separate queue for each VC. At each hop, the receiving node tells the transmitting node how many cells it can send for each VC. The number of cells that can be transmitted is called "credits". The number of cells received are carefully monitored so that lost cells can be detected. This approach has a potential to provide full link utilization and guarantee zero loss due to congestion. However, this scheme requires per-VC queuing, per-VC service, and per-VC monitoring. The number of VCs that exist at any time is large and, therefore, per-VC operations are considered undesirable by most switch manufacturers. It is preferable to keep all per-VC operations (except switching) at the end systems. The complexity and cost of implementation has been the main objection to this approach. Vendors are typically not willing to pay the high cost of per-VC operations for the noble goal of "zero loss." The small probability of loss is preferred, particularly if it results in considerable savings in cost.

The rate-based approach is based on end-to-end rate control using feedback from the network. Initially, a backward explicit congestion notification (BECN) method was proposed. However, a forward explicit congestion notification (FECN) was subsequently considered instead of the BECN method. In either case, the cells contain a single bit which is marked by the switches if congested. In FECN, the destination end station monitors these bits and sends a control cell back to the source asking it to adjust the rate up or down. In the BECN version, the congested switches directly send the control cell to the source (and the bit is actually not required).

A sequence of FECN schemes have been proposed at the ATM Forum. The latest one is called the Proportional Rate Control Algorithm (PRCA). In this proposal, the sources would set the FECN bit to one except in every nth cell (where n is a parameter). The switches set the bit to one when they are congested (and do nothing if not congested). If the destination receives a cell with FECN bit set to zero, it concludes that the network is not congested and sends a control cell to the source asking it to increase its rate. The sources continually decrease their rates (after sending each cell) unless they receive the control cell from the destination. A multiplicative decrease and additive increase is used to achieve fairness.

The single bit feedback, while satisfactory for window-based schemes is too slow for rate-based schemes. In window-based scheme, if the control is slow to change (and therefore remains constant for a while), the queue length cannot exceed the specified window size. This is not true for rate-based schemes. If the rate is over the optimal even by a small amount, the queues will keep building, leading to overflow and cell loss. It is important to measure the rate quickly and inform the sources of the rate as soon as possible. These considerations led to the following two explicit rate indication proposals at the ATM Forum meeting of July, 1994, the MIT scheme and the UCI scheme.

The MIT scheme, developed at the Massachusetts Institute of Technology, consists of the sources periodically sending their rates to switches in control cells. The switches reduce the rate value if necessary. The cells are returned to the source by the destination node.

The control cells contain a "Reduced bit" and the source's "Desired rate." Each switch monitors its traffic and calculates its available capacity per VC. This quantity is called the "fair share."

If the "desired rate" is higher than or equal to the "fair share", the desired rate is reduced to the "fair share" and the reduced-bit is set. If the desired rate is less than the fair share, the switch does not change the fields of the control cell.

The destination sends the control cell back to the source. If the source finds the reduced bit set, it adjusts its rate to that returned in the "desired rate" field of the control cell. Next time, the source sends this new rate in the next control cell transmitted. If the reduced bit is clear, the source can increase its rate but it must first determine how much it can increase by sending a control cell with a higher desired rate.

The switches maintain a list of all of its VCs and their last seen desired rates. All VCs whose desired rate is higher than the switch's fair share are considered "overloading VCs." Similarly, VCs with desired rate below the fair share are called "underloading VCs." The underloading VCs are bottlenecked at some other switch and, therefore, cannot use additional capacity at this switch even if available.

The capacity unused by the underloading VCs is divided equally among the overloading VCs. Thus, the fair share of the VCs is calculated as follows:

$$\text{Fair Share} = \frac{\text{Capacity} - \Sigma \text{ Bandwidth of underloading } VCs}{\text{total number of } VCs - \text{Number of underloading } VCs}$$

It is possible that after this calculation some VCs that were previously underloading with respect to the old fair share can become overloading with respect to the new fair share. In this case, these VCs are re-marked as overloading and the fair share is recalculated.

The MIT scheme has been modified slightly by researchers at the University of California, Irvine ("UCI"). The switch algorithm is simplified. The switch does not "remember" any VCs rate. Instead, it computes an exponentially weighted average of the declared desired rates and uses the average as a fair share. The weighting coefficient used for averaging is different during overload and during underload. The MIT scheme requires an order n, O(n), computation in the sense that the number of instructions to compute fair share increase linearly with the number of VCs. The UCI modification makes it of order 1, O(1), in the sense that the computational overhead to process a control cell does not depend upon the number of VCs. However, its ability to achieve efficient and fair operation is questionable.

The use of exponentially weighted average of "desired rates" as the fair share does not seem meaningful. First of all, "desired rates" may not be close to the actual transmission rates. Secondly, any average is meaningful only if the quantities are related and close to each other. The desired rates of various sources can be far apart. Thirdly, the exponentially weighted average may become biased towards higher rates. For example, consider two sources running at 1000 Mbps and 1 Mbps. In any given interval, the first source will send 1000 times more control cells than the second source and so the exponentially weighted average is very likely to be 1000 Mbps regardless of the value of the weight used for computing the average.

The present invention contemplates a new and improved congestion management method which resolves the above-referenced difficulties and others.

SUMMARY OF THE INVENTION

A method adaptable for use in a computer network is provided. The computer network has at least one source and one destination between which data is transferred via at least one switch. The switch determines its actual load level.

In accordance with another aspect of the invention, a control cell is received as a switch from the source. The control cell includes a first load adjustment factor and is transmitted from the source at a first transmission rate.

In accordance with another aspect of the invention, a second adjustment factor is selected as the maximum of one of the current load level and the first load adjustment factor.

In accordance with another aspect of the invention, the control cell including the second load adjustment factor is returned to the source by the destination.

In accordance with another aspect of the invention, the transmission rate is adjusted in the source in accordance with the second load adjustment factor.

In a more limited aspect of the invention, the transmission rate is adjusted using a forward explicit congestion notification method (FECN).

In a more limited aspect of the invention, the adjustment of the transmission rate is accomplished using a backward explicit congestion notification method (BECN).

One notable advantage of the present method is that the actual load level of each switch is used, thus allowing for the maximum use of available capacity.

Further scope of the applicability of the present invention will become apparent from the detailed description provided below. It should be understood, however, that the detailed description and specific example, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination, of the various parts of the device, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 14:
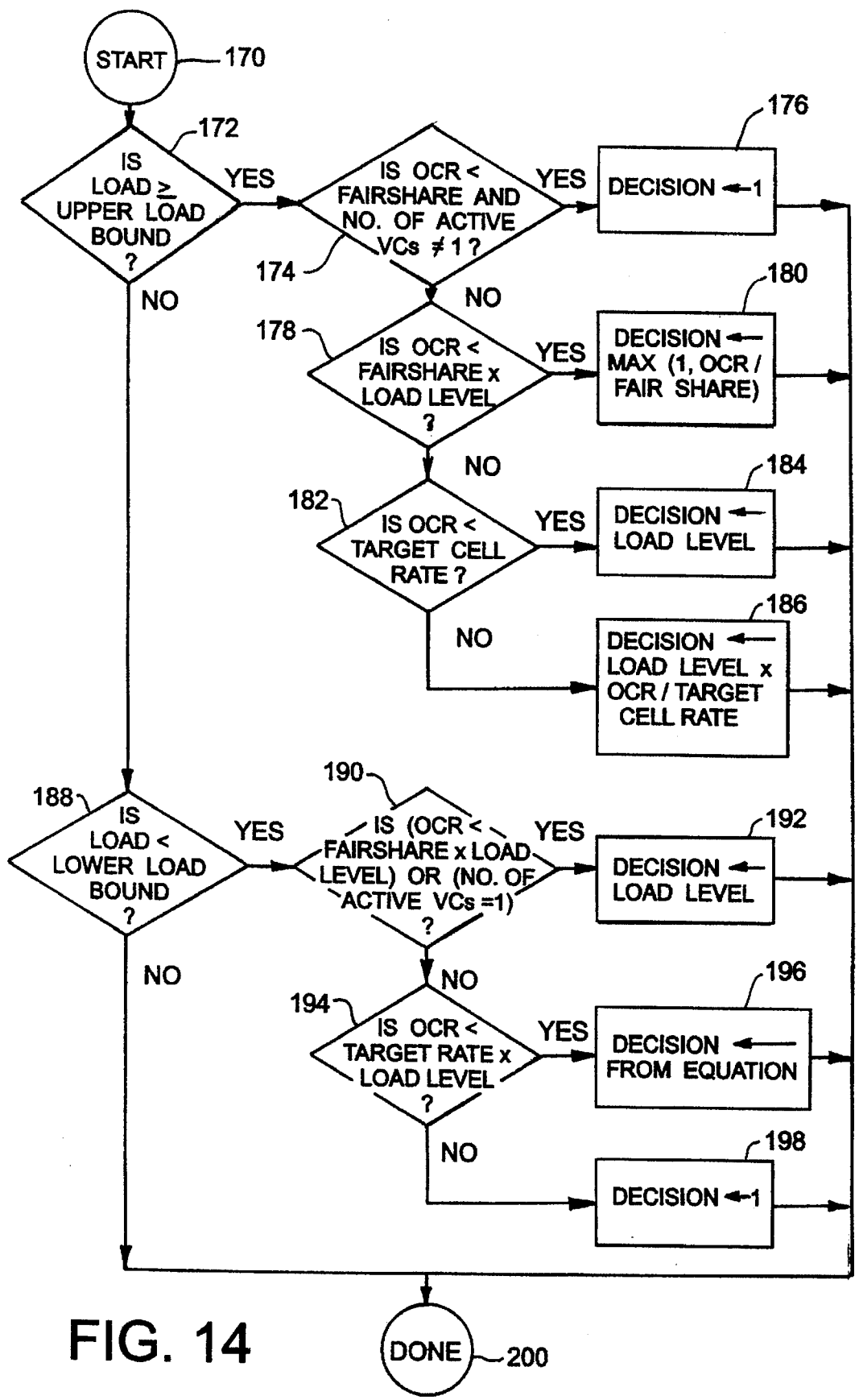
FIG. 14 is a flow chart of the aggressive fairness option of the method of FIG. 10.
Figure 17:
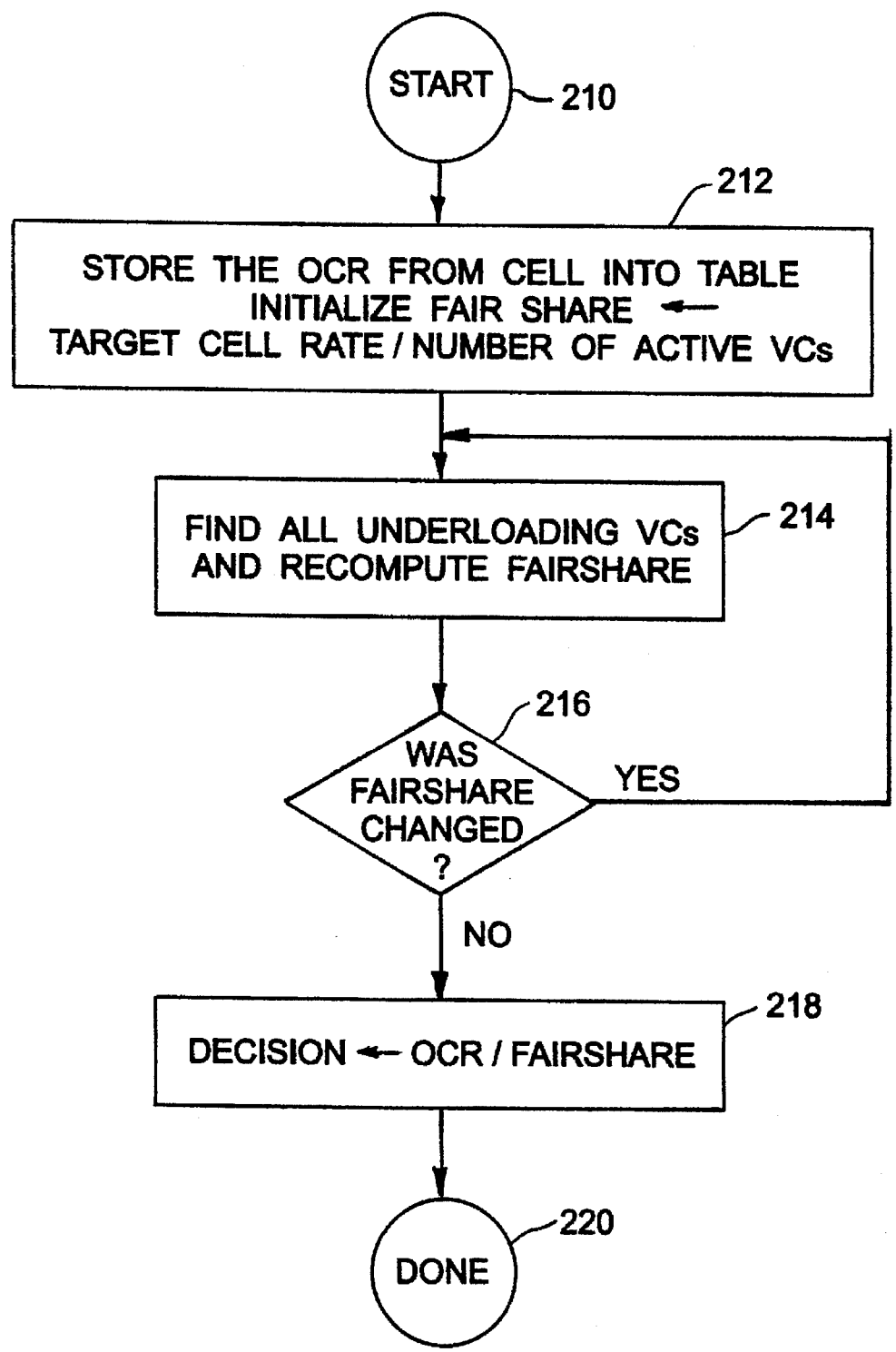
FIG. 17 is a flow chart of the precise fair share computation option of the method of FIG. 10.

Referring now to the drawings wherein the showings are for the purposes of illustrating the preferred embodiments of the invention only and not for purposes of limiting same, FIGS. 6–12 provide flow charts representing the overall preferred method. FIGS. 14 and 17 further provide flowcharts for optional features of the preferred method. It is recognized that the present method is suitably implemented in the structure disclosed in the following preferred embodiment and operates in conjunction with software-based control procedures. However, it is contemplated that the control procedure be embodied in another suitable media.

Figure 1:
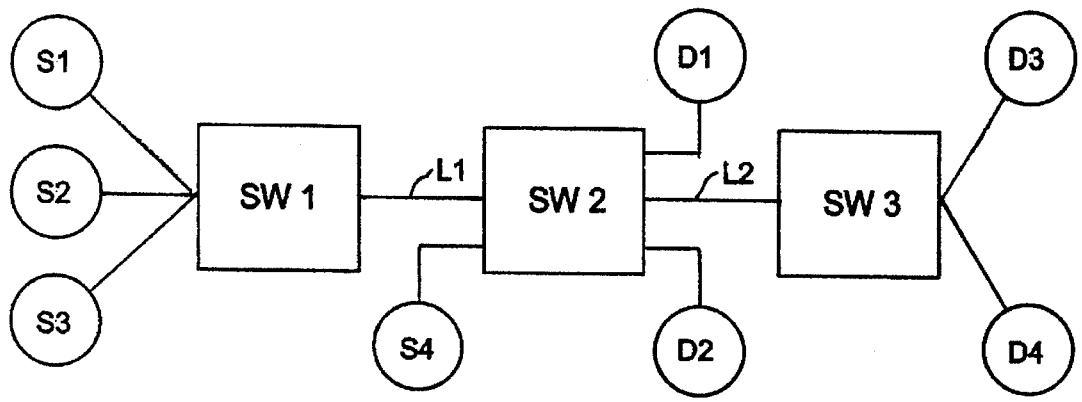
FIG. 1 is a graphic representation of a network configuration for max-min fairness example.
Figure 2:
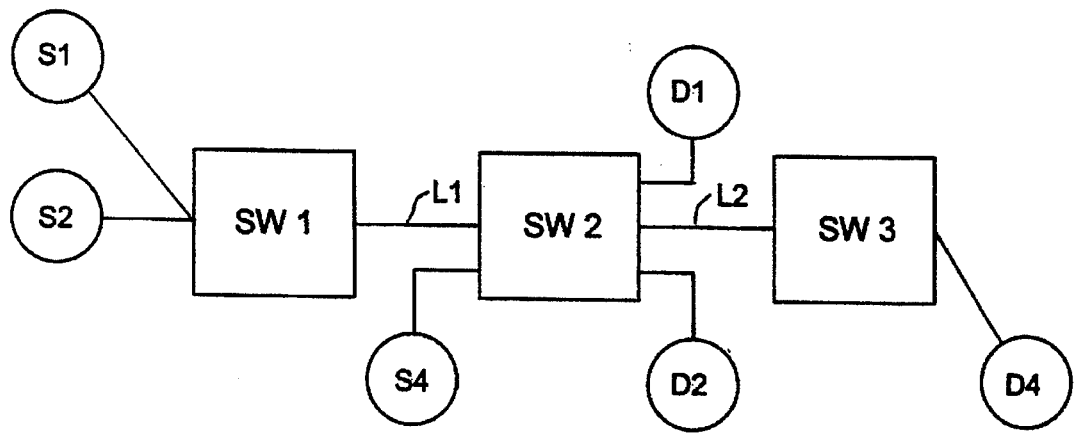
FIG. 2 is a graphic representation of a network configuration for max-min fairness example with source S3 removed.

Moreover, as those skilled in the art will appreciate, a network configuration (for example, the network illustrated in FIG. 1) having end systems, i.e., sources and destinations, switches, links, and supporting hardware, all governed by a network manager, serves as a suitable hardware environment to implement the present method. It is further recognized, however, that the precise hardware configuration is dependent upon the network in which implementation is desired.

The present method is an explicit rate indication scheme similar to the MIT scheme. However, it does not necessarily require the switches to remember the rates of all VCs. Thus, the minimal storage requirements as well as the computational complexity becomes order 1, O(1), that is, the computation or storage does not change as the number of VCs is changed. Also, it uses the exact overload as measured at the switch to determine the allowed rate.

Both the problems and the solutions have thus far been described in terms of ATM networks. However, most of the discussion, and the discussion regarding the present invention, applies to packet switching networks as well. In particular, if the packets are large, the feedback can be included in the header and the need for special control cells can be avoided.

The present method also requires sources to monitor their load and periodically send control cells (FIG. 3) that contain the load information. The switches monitor their own load and use that load calculation in combination with the information provided in the control cells to compute a factor by which the source should increase or decrease its rate of transmission. At the destination, the control cell is simply returned to the source, which then adjusts its rate as instructed by the network. The key difference between the present method and other schemes is in the fact that the source and the switches measure cell rates and in the way the rates adjustment factor is computed and used.

Figure 3:
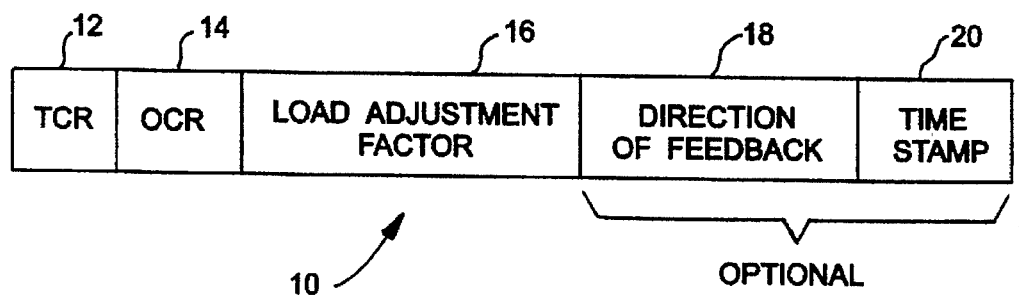
FIG. 3 is a graphic representation of the control cell format of the present invention.

Referring now initially to FIG. 3, the control cell 10 of the present invention is illustrated. As shown, the control cell 10 contains the follow fields:

1. Transmitted Cell Rate (TCR) 12: Transmitted cell rate
2. The Offered Cell Rate (OCR) 14: Offered (average) cell rate as measured at the source
3. Rate, or load, Adjustment Factor 16
4. The direction of feedback 18 (backward/forward) (OPTIONAL)
5. Timestamp 20 containing the time at which the control cell was generated at the source (OPTIONAL)

With respect to the operation of the sources implemented in the present invention, each source makes three general determinations:

1. How often to send control cells
2. How to measure the average offered cell rate
3. How to respond to the feedback received from the network With respect to "how often", the control cells are sent periodically every T interval. Although, it can also be done by the cell count, the interval-based transmission allows the scheme to work on networks with widely varying link speeds. As will be addressed below, the averaging interval used throughout the path should be the same. The network manager sets the averaging interval parameter for each switch. The maximum of the averaging interval along a path is returned in the control cell. This is the interval that the source uses to send the control cells.

During an idle interval, no marked cells are sent. If the source measures the OCR to be zero, then one marked cell is sent. Subsequent marked cells are sent only after the rate becomes non-zero.

Figure 4:
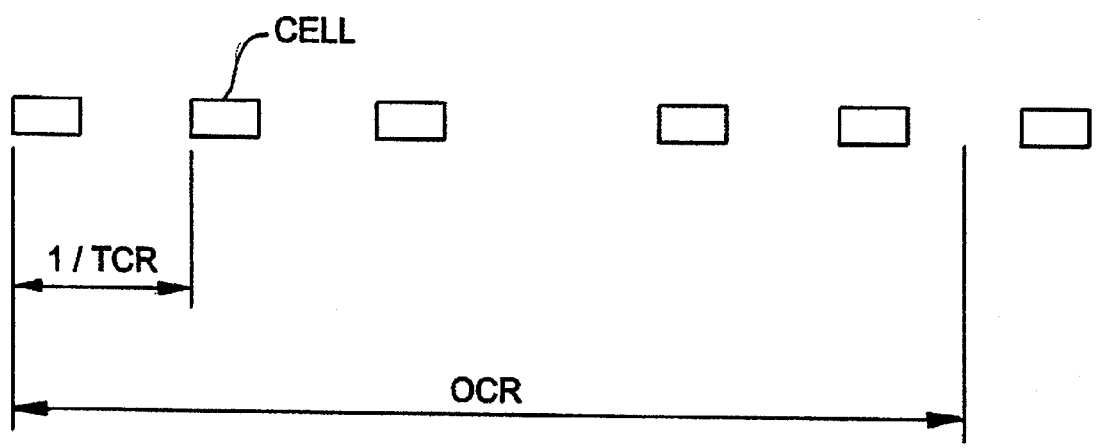
FIG. 4 is a graphic representation of the transmitted instantaneous cell rate and offered average cell rate of the present invention.
Figure 5:
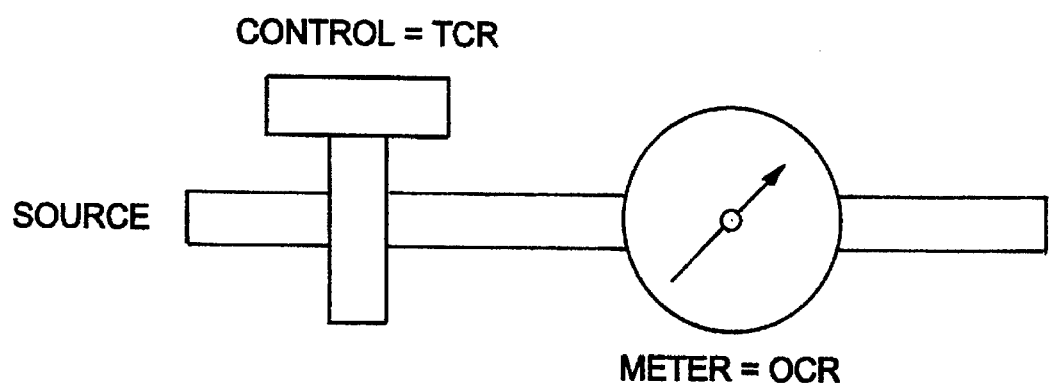
FIG. 5 is a graphic representation of the transmitted controlled cell rate and an offered measured cell rate of the present invention.

Unlike any other scheme proposed, each source also measures its own load. The measurement is done over the same averaging interval that is used for sending the control cells. Note that there are two separate parameters: transmitted cell rate (TCR) and offered cell rate (OCR). The first is the instantaneous cell rate during burst transmissions. The cells are sent equally spaced in time. The inter-cell time is computed based on the transmitted cell rate. However, the source may be idle in between the bursts and so the average cell rate is different from the transmitted cell rate. This average is called the offered cell rate and is also included in the cell. This distinction between TCR and OCR is shown in FIG. 4. Notice that TCR is a control variable (like the knob on a faucet) while the OCR is a measured quantity (like a meter on a pipe). This analogy is shown in FIG. 5.

Figure 6:
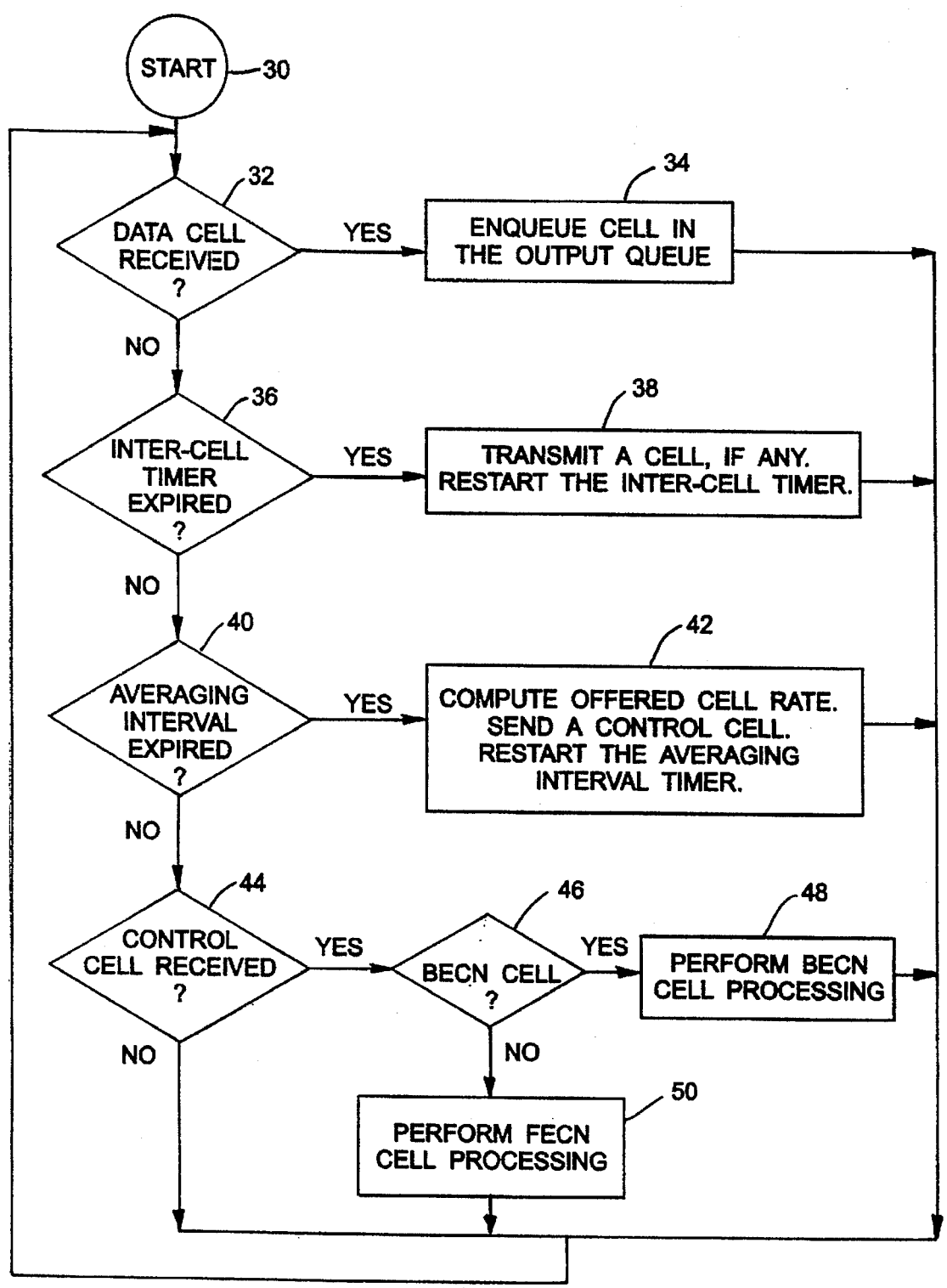
FIG. 6 is a flow chart illustrating the source operation of the present invention.

Referring now more particularly to FIG. 6, the control method for the source is illustrated. Specifically, the procedure is started (step 30) and a determination is made whether a data cell has been received by the source (step 32). If a data cell is received, the cell is then queued in the output queue (step 34). If a data cell is not received, a determination is made whether the timer has expired (step 36). If the timer has expired, a cell is transmitted if available (step 38). If the timer has not expired, a determination is made whether the averaging interval has expired (step 40). If the averaging interval has expired, the offered cell rate, OCR, is computed, a control cell is sent, and the averaging interval timer is restarted (step 42). If the averaging interval has not expired, a determination is made as to whether a control cell has been received in the source (step 44). If no control cell has been received, steps 32–44 are again performed. If the control cell is received, a determination is made whether it is a BECN cell (step 46). If a BECN cell has been received, BECN cell processing is performed (step 48). If no BECN cell has been received, FECN cell processing is performed (step 50). After steps 34, 38, 42, 48, and 50, steps 32–44 are performed.

Figure 7:
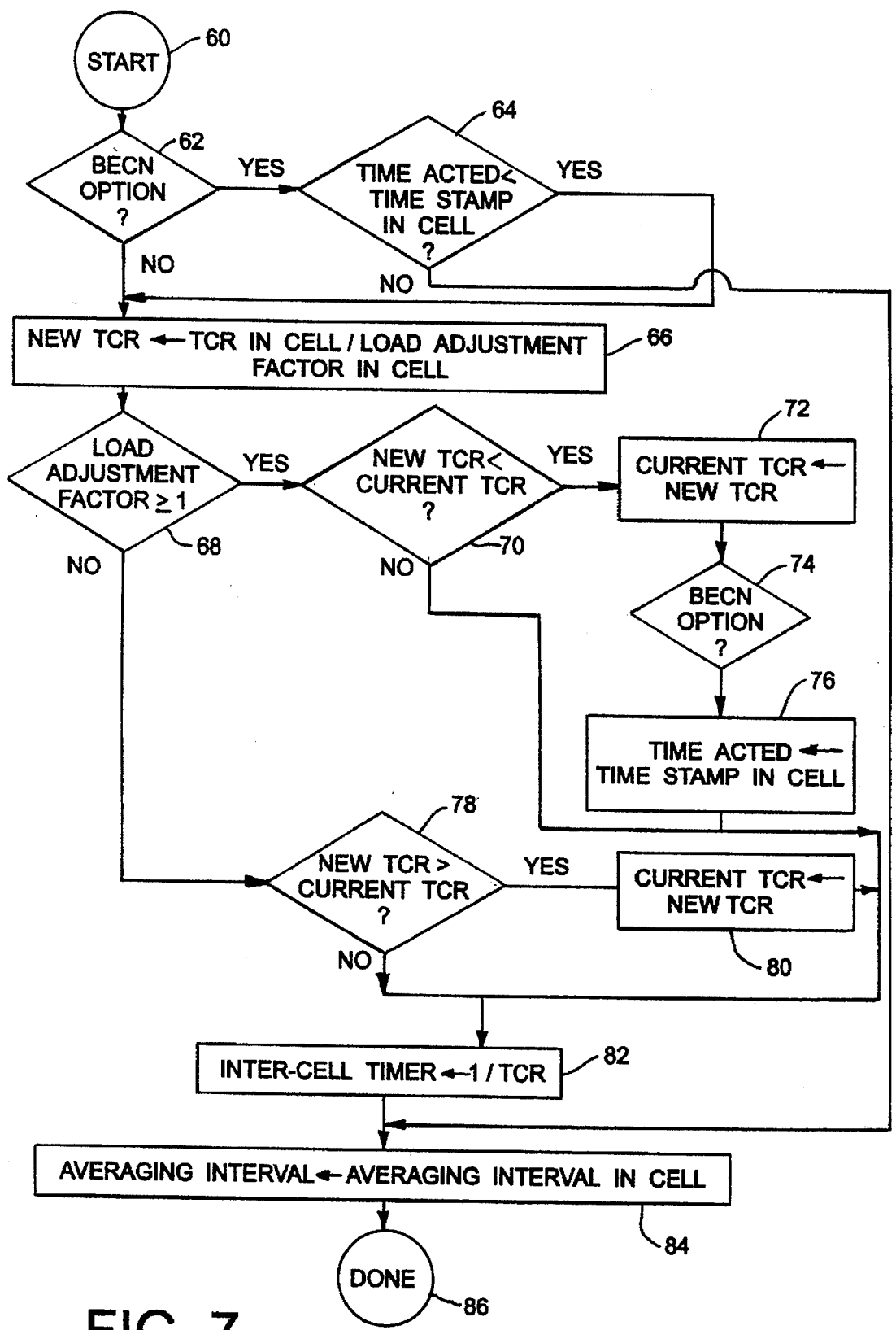
FIG. 7 is a flow chart illustrating the FECN cell processing of the method of FIG. 6.

FIG. 7 illustrates the FECN cell processing of step 50. More specifically, the FECN cell processing is started (step 60) and a determination is made whether a BECN option is present (step 62). If a BECN option is present, a determination is made whether the time acted (which represents the timestamp of the most recent cell acted upon where rate was decreased) is less than the timestamp in the cell (step 64). If the time acted is not less than the timestamp in the cell, the averaging interval is replaced with the averaging interval in the cell (step 84) and the procedure completed (step 86). If the time acted is less than the timestamp in the cell and no BECN option is to be performed, the TCR in the cell divided by the load adjustment factor in the cell becomes the new TCR (step 66).

A determination is then made whether the load adjustment factor is greater than or equal to 1 (step 68). If the load adjustment factor is greater than or equal to 1, a determination is made whether the new TCR is less than the current TCR (step 70). If the new TCR is less than the current TCR, the new TCR replaces the current TCR (step 72). If a BECN option is required (step 74), the timestamp in the cell replaces the time acted (step 76). Afterwards, or if the new TCR is not less than the current TCR as determined in step 70, the inter-cell timer is replaced with 1 divided by TCR (step 82) and steps 84 and 86 performed.

If the load adjustment factor is not greater than or equal to 1, a determination is made whether the new TCR is greater than the current TCR (step 78). If the new TCR is greater than the current TCR, the new TCR replaces the current TCR (step 80). Afterwards, or if the new TCR is not greater than the current TCR, inter-cell timer is replaced with 1 divided by TCR (step 82) and the averaging interval in the cell replaces the averaging interval (step 84), and the procedure is completed (step 86).

Figure 8:
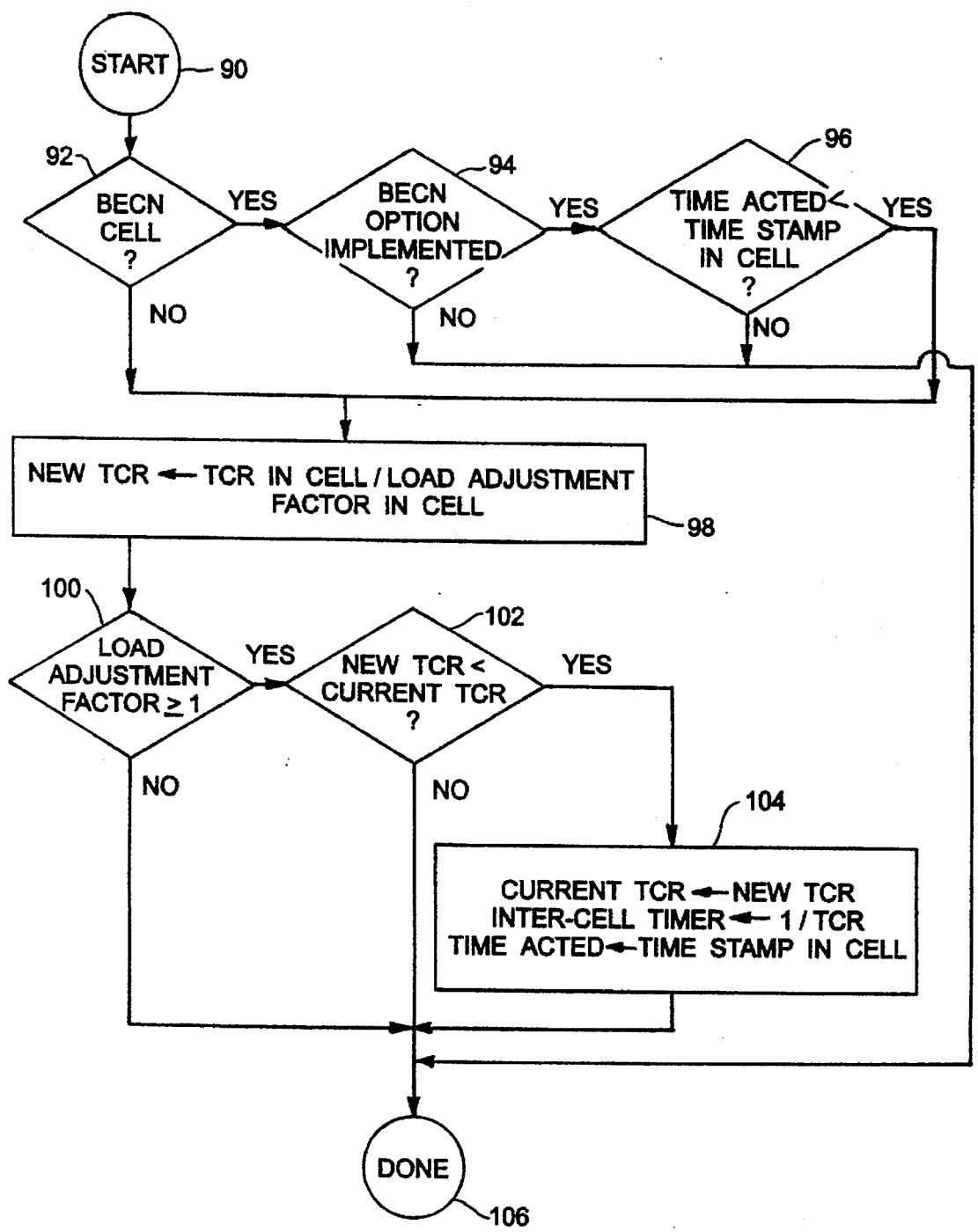
FIG. 8 is a flow chart illustrating the BECN cell processing of the method of FIG. 6.

Referring now to FIG. 8 wherein the method of step 48 of FIG. 6 is illustrated, a BECN cell processing is started (step 90) and a determination is made whether a BECN cell has been received (step 92). If a BECN cell has been received, a determination is made whether a BECN option is implemented (step 94). If a BECN option is implemented, a determination is made whether the time acted is less than the timestamp in the cell (step 96). If the time acted is not less than the timestamp in the cell or the BECN option is not implemented at step 94, then the procedure is completed (step 106).

If, however, the time acted is less than the timestamp in the cell or if no BECN cell is received, the new TCR is determined to be the TCR in the cell divided by the load adjustment factor in the cell (step 98). A determination is then made whether the load adjustment factor is greater than or equal to 1 (step 100). If the load adjustment factor is greater than or equal to 1, a determination is made whether the new TCR is less than the current TCR (step 102). If the new TCR is less than the current TCR, the new TCR replaces the current TCR 1 divided by TCR replaces the inter-cell timer, and the timestamp in the cell replaces the time acted (step 104). The procedure is then completed (step 106).

If, however, the new TCR is not less than the current TCR at step 102 or if the load adjustment factor is not greater than or equal to 1 at step 100, then the procedure is simply ended (step 106).

As is apparent to those skilled in the art upon a review of FIGS. 6–8, there are basically four events that can occur at the source adapter. These events and the action to be taken on these events are described below in a detailed pseudocode:

```
1.  A data cell or cell burst is received from the host.
    Enque the cell(s) in the output queue.
2.  The inter-cell transmission timer expires.
    IF Output_Queue NOT Empty THEN deque the first cell and transmit;
    Increment Transmitted_Cell_Count;
    Restart Inter_Cell_Transmission_Timer;
3.  The averaging interval timer expires.

Offered_Cell_Rate <-- Transmitted_Cell_Count/Averaging_Interval;

Transmitted_Cell_Count <-- 0;
    Create a control cell;

OCR_In_Cell <-- Offered_Cell_Rate;

TCR_In_Cell <-- max(TCR, OCR);
    Transmit the control cell;
    Restart Averaging_Interval_Timer;
4.  A control cell returned from the destination is received.
    IF ((BECN_Option AND Time_Already_Acted < Time_Stamp_In_Cell) OR
        (NOT BECN_Option))
        THEN BEGIN New_TCR <-- TCR_In_Cell/Load_Adjustment_Factor_In_Cell;
        IF Load_Adjustment_Factor_In_Cell ≥ 1
            THEN IF New_TCR < TCR
                THEN BEGIN TCR <-- New_TCR;
                    IF(BECN_Option)THEN Time_Already_Acted <-- Time_Stamp_In_Cell;
                    END
                ELSE IF Load_Adjustment_Factor_In_Cell < 1

THEN IF New_TCR > TCR THEN TCR <-- New_TCR;

Inter_Cell_Transmission_Time <-- 1/TCR;
        END; (*of FECN Cell processing*)

Averaging_Interval <-- Averaging_Interval_In_Cell;
5.  A BECN control cell is received from some switch.
    IF BECN_Option
        THEN IF Time_Already_Acted < Time_Stamp_In_Cell
            THEN IF Load_Adjustment_Factor_In_Cell ≥ 1
                THEN BEGIN NEW_TCR <-- TCR_In_Cell/Load_Adjustment_Factor_In_
                        Cell;
                    IF New_TCR < TCR
                        THEN BEGIN
```

-continued

```
        TCR <-- New_TCR;
        Inter_Cell_Transmission_Time <-- 1/TCR;
        Time_Already_Acted <-- Time_Stamp_In_Cell;
      END;
END;
```

With respect to the switch operation of the switch of the present invention, each switch makes the following determinations:

1. How to measure the available capacity
2. How to achieve efficiency
3. How to achieve fairness Measuring the current load consists of simply counting the number of cells received during a fixed averaging interval. The interval is set by the network manager. Based on the known capacity of the link, the switch can compute the load level and determine whether it is overloaded or underloaded.

Since running a link at full load generally results in large queues, it is best to target the link utilization at close to but not quite at 100%. To achieve this the network manager selects a target utilization, say 90%. Whenever the input rate is more than 90% of the nominal capacity, the link is said to be overloaded and whenever the utilization is less than 90%, the link is said to be underloaded. The link cell rate when the network is operating at the target utilization is computed:

$$\text{Target Cell Rate} = \frac{\text{Target Utilization} \times \text{Link bandwidth in Mbps}}{\text{Cell size in bits}}$$

The current load level is then given by:

$$\text{Current Load level} = \frac{\text{Number of cells received during the averaging interval}}{\text{Target Cell Rate} \times \text{Averaging Interval}}$$

To achieve efficiency, all we need is to replace the load adjustment factor in each control cell by the maximum of the current load level and the load adjustment value already in the cell.

Load Adjustment Factor←max (load adjustment factor in the cell, current load level in this switch)

This simple procedure is sufficient to bring the network to efficient operation within the next round trip. However, the allocation of the available bandwidth among contending VCs may not be fair. To achieve fairness we need to make use of the other information in the control cells as hereinafter described.

The switches in the present invention also remember the rates declared by various sources and use them in computing the fair share. However, there are two differences over the known techniques. First, the rates declared by the sources are "Offered Average Cell Rates (OCRs)" and not the desired cell rates, which may or may not be related to the actual rates. Secondly, in the simplest version of the present invention rates of all sources are not required. All that is needed is the number of active sources, which can be counted either by counting the number of sources with non-zero OCRs or by marking a bit in the VC table whenever a cell from a VC is seen. The bits are counted at the end of each averaging interval and are cleared at the beginning of each interval.

In resource allocation, the top priority is to bring the network to efficient operation. Once the network is operating close to the target utilization, steps to achieve fairness need be taken. The network manager declares a target utilization band (TUB), say, 90±9% or 81% to 99%. Whenever the link utilization is in TUB, the link is said to be operating efficiently. As will be seen later, it is preferable to express TUB in the $U(1\pm\Delta)$ format, where U is the target utilization level. For example, 90±9% is expressed as 90(1±0.1)%.

Given the number of active sources, the fair share is computed as follows:

$$\text{Fair Share} = \frac{\text{Target Cell Rate}}{\text{Number of Active Sources}}$$

To achieve fairness, we treat the underloading and overloading sources differently. Underloading sources for our scheme are those sources that are using less than the fair share. While overloading sources are those that are using more than the fair share.

If the current load level is z, the underloading sources are treated as if the load level is $z/(1+\Delta)$. Here, $\Delta$ is the half-width of the TUB.

If the OCR in the control cell is less than the fair share, the load adjustment factor in the cell is changed as follows:

$$\text{Load Adjustment Factor} \leftarrow \max\left(\text{Load Adjustment Factor in the cell}, \frac{z}{(1+\Delta)}\right)$$

On the other hand, if the OCR in the control cell is more than the fair share, the load adjustment factor in the cell is adjusted as follows:

$$\text{Load Adjustment Factor} \leftarrow \max\left(\text{Load Adjustment Factor in the cell}, \frac{z}{(1+\Delta)}\right)$$

These operations guarantee that once inside the TUB, the network remains in the TUB unless the number of sources or their load pattern changes. In other words, TUB is a "closed" operating region. This statement is true for any value of $\Delta$ less than 0.5 assuming negligible feedback delay.

If $\Delta$ is small, as is usually the case, division by $1+\Delta$ is approximately equivalent to a multiplication by $1-\Delta$ and vice versa.

Figure 9:
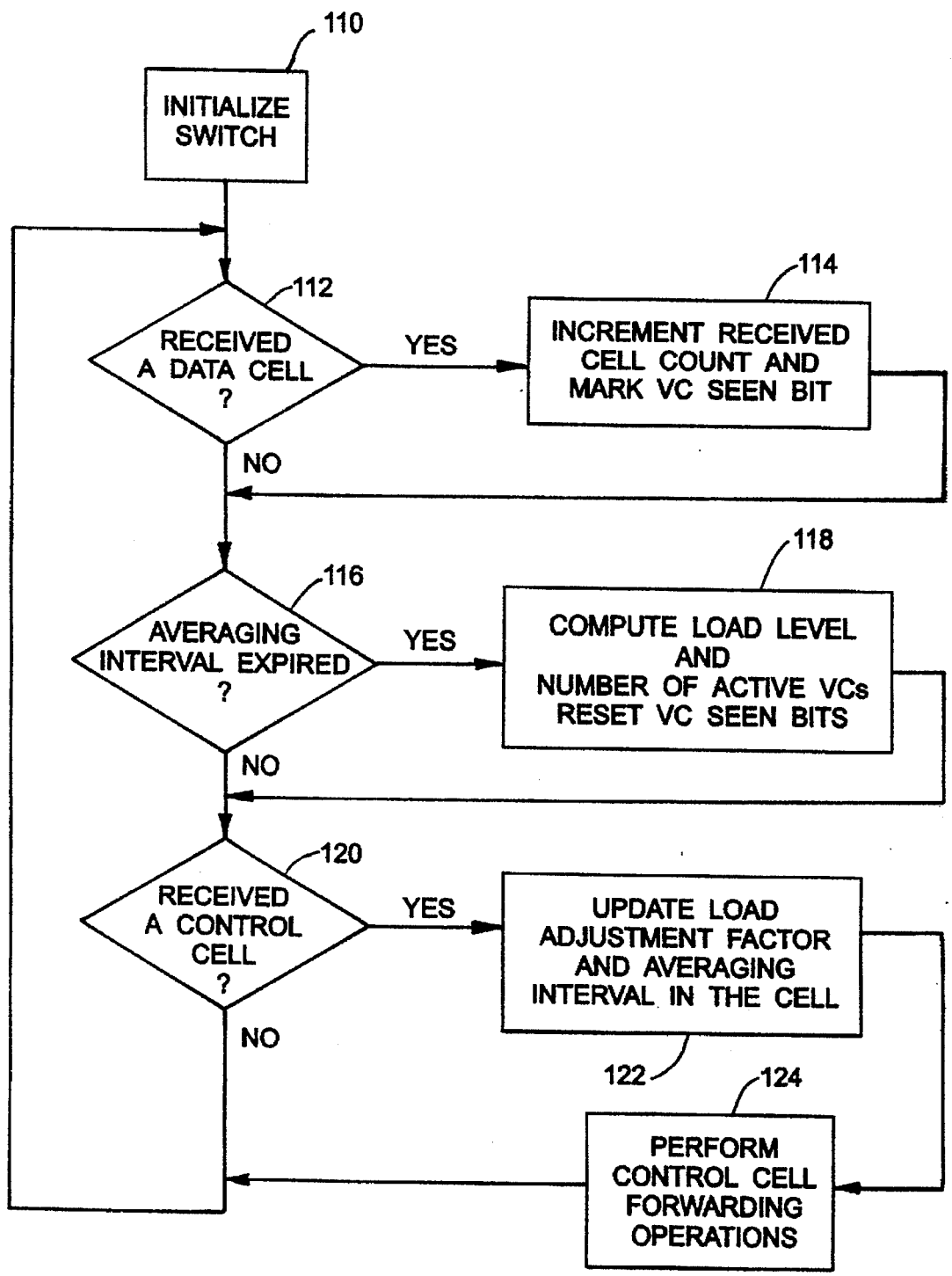
FIG. 9 is a flow chart illustrating the switch operation of the present invention.

Now, more particularly referring to FIG. 9, the method implemented in the switch is initiated by initializing the switch (step 110). A determination is then made whether a data cell has been received at the switch (step 112). If a data cell has been received at the switch, the received cell count is incremented and a "VC seen bit" corresponding to the VC is marked (step 114). Afterwards, or if no data cell is received, a determination is made whether the averaging interval has expired (step 116). If the averaging interval has expired, the load level is computed and the active VCs reset the VC seen bits (step 118). Then, or if the averaging interval has not expired, a determination is made whether the control cell has been received (step 120). If a control cell has been received, the load adjustment factor is updated and the averaging interval in the cell is also updated (step 122). Cell forwarding operations are performed (step 124) and the procedure is returned to step 112. If a control cell is not received, the procedure is also returned to step 112.

Figure 10:
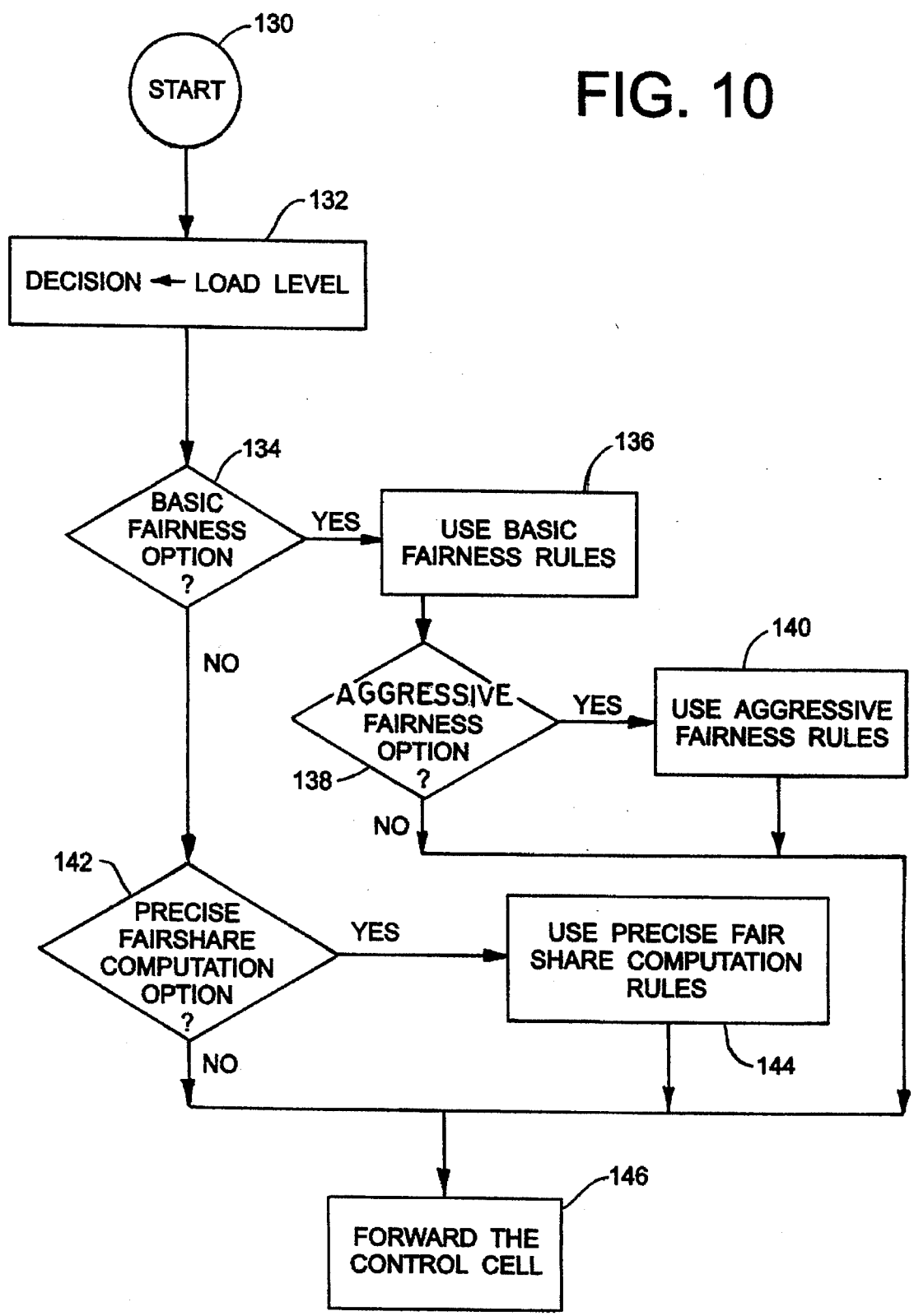
FIG. 10 is a flow chart of the control cell processing in the switch of the present invention.

FIG. 10 illustrates a flow chart representing the control cell processing in the switch, e.g. steps 122 and 124 of FIG. 9. More specifically, the control cell processing is started (step 130) and the load level is used as the decision (or, as may be hereafter described "the second load adjustment factor") (step 132). A determination is then made whether the basic fairness option should be implemented (step 134). If the basic fairness option is implemented, the basic fairness rules are used (step 136). A determination is then made whether the aggressive fairness option should be implemented (step 138). If the aggressive fairness option should be implemented, the aggressive fairness rules are used (step 140). Subsequently, or if the aggressive fairness option is not implemented, the control cell is forwarded (step 146).

If the basic fairness option is not implemented, a determination is made whether the precise fairshare computation option is implemented (step 142). If the precise fairshare computation option is implemented, the precise fairshare computation rules are used (step 144). Subsequently, or if the precise fairshare computation option is not used, the control cell is forwarded (step 146).

Figure 11:
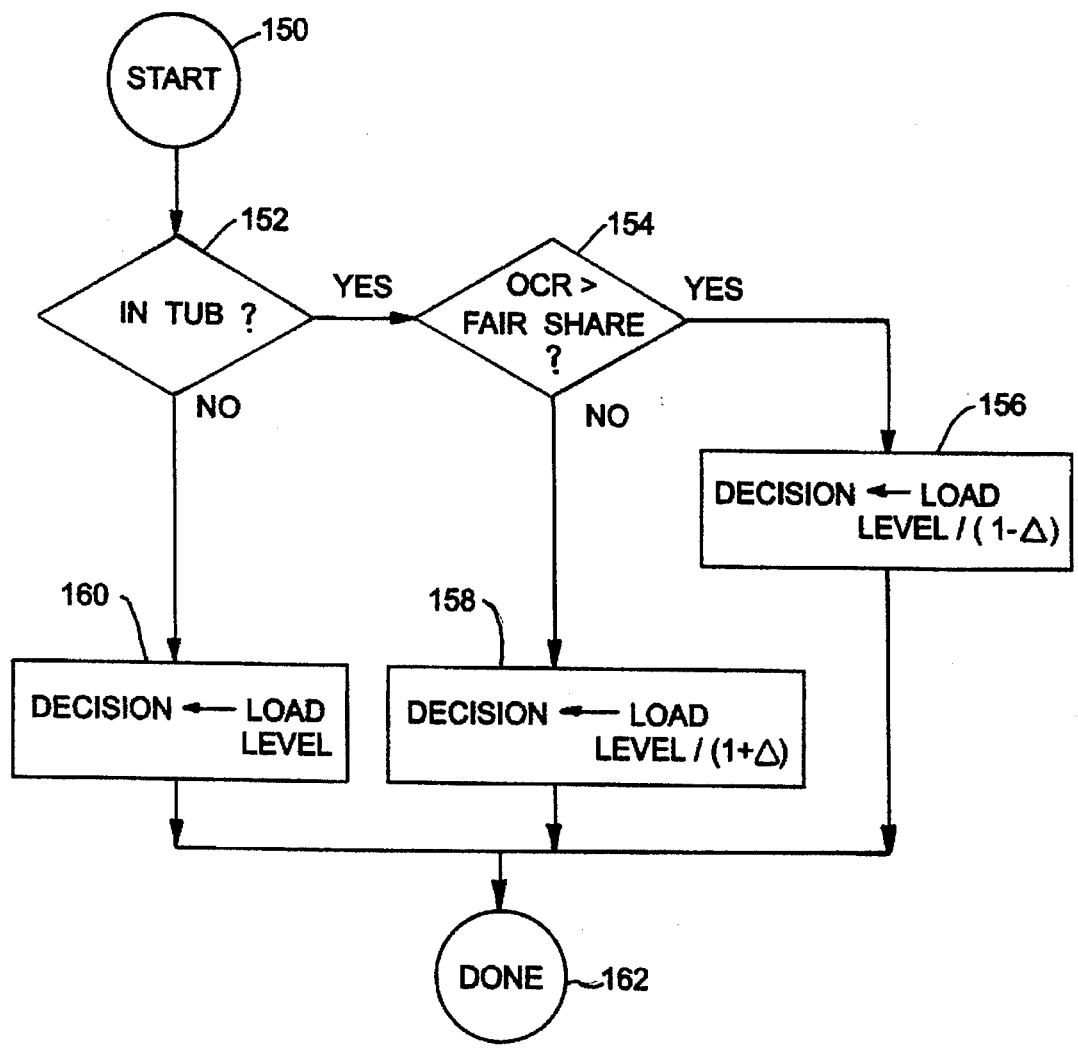
FIG. 11 is a flow chart of the basic fairness option of the method of FIG. 10.

FIG. 11 illustrates the flow chart for the basic fairness option implemented in the switch, i.e. step 136 of FIG. 10. The aggressive fairness option, the precise fairshare computation option, and the BECN option will be described herein below. Now, referring to FIG. 11, basic fairness rules are started (step 150) and a determination is made whether the system is in the target utilization band (step 152). If the load is in the target utilization band, a determination is made whether the offered cell rate of the source is greater than its fair share (step 154). If the offered cell rate is greater than the fair share, the decision is replaced with the load level divided by $(1-\Delta)$ (step 156). Subsequently, the procedure is completed (step 162). If the offered cell rate is not greater than the fair share, then the decision is replaced by the load level divided by $(1+\Delta)$ (step 158). The procedure is subsequently terminated (step 162). Additionally, if the source is not in the target utilization band, the decision is replaced by the load level (step 160) and the procedure is completed (step 162).

Figure 12:
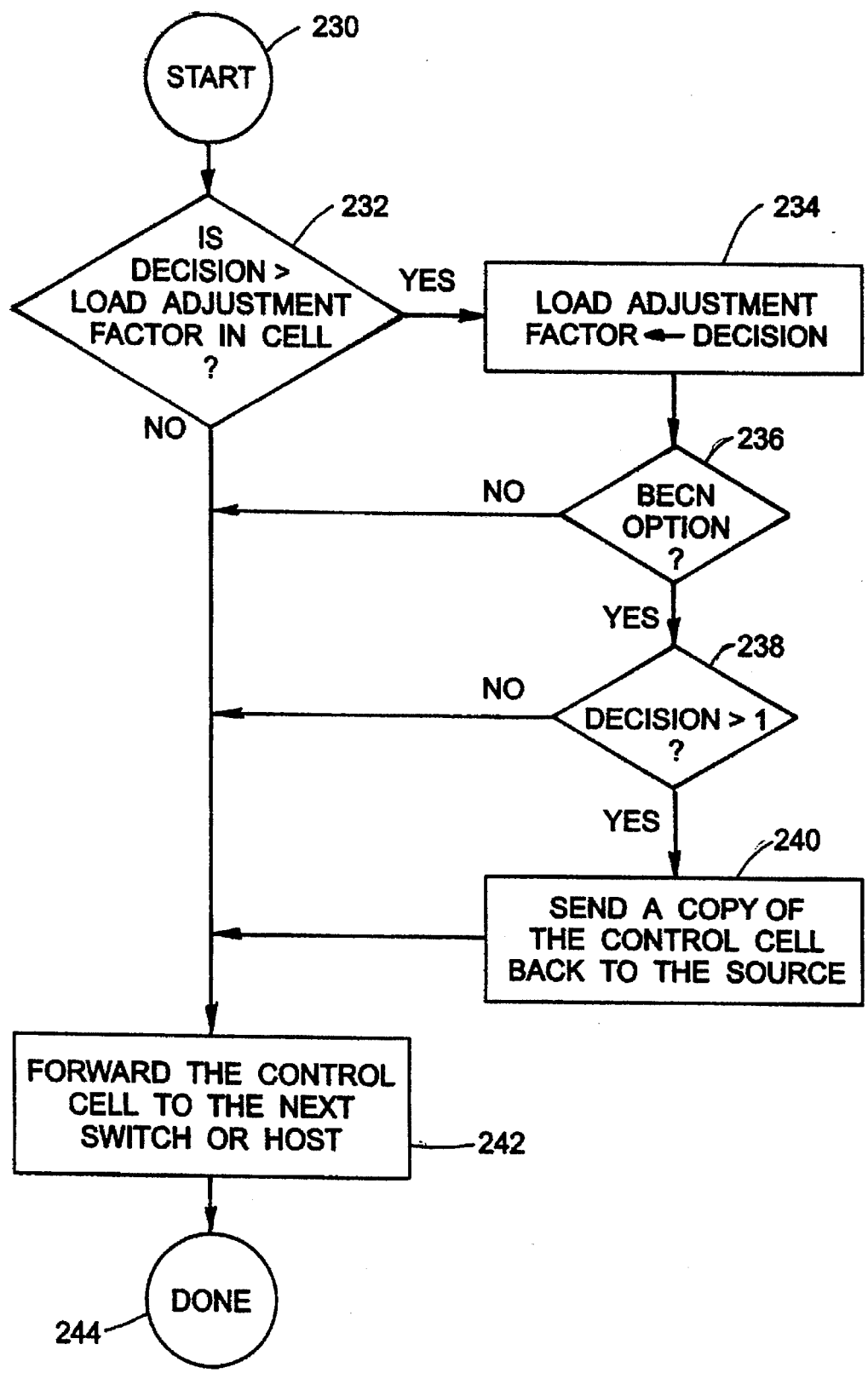
FIG. 12 is a flow chart of the control cell forwarding of FIG. 10.

Now, referring to FIG. 12 wherein step 146 of FIG. 10 is more particularly illustrated, the procedure is started (step 230) and a determination is made whether the decision is greater than the load adjustment factor in the cell (step 232). If the decision is greater than the load adjustment factor in the cell, the load adjustment factor is replaced by the decision (step 234). It is then determined whether the BECN option is implemented (step 236). If the BECN option is implemented, a determination is made whether the decision is greater than 1 (step 238). If the decision is greater than 1, a copy of the control cell is sent back to the source (step 240) and a control cell is forwarded to the next switch or host (step 242). The procedure is then complete (step 244). If, however, the decision is less than or equal to the load adjustment cell or the BECN option is not implemented or the decision is not greater than 1, then the control cell is simply forwarded to the next switch or host (step 242) and the procedure completed (step 244).

Figure 13:
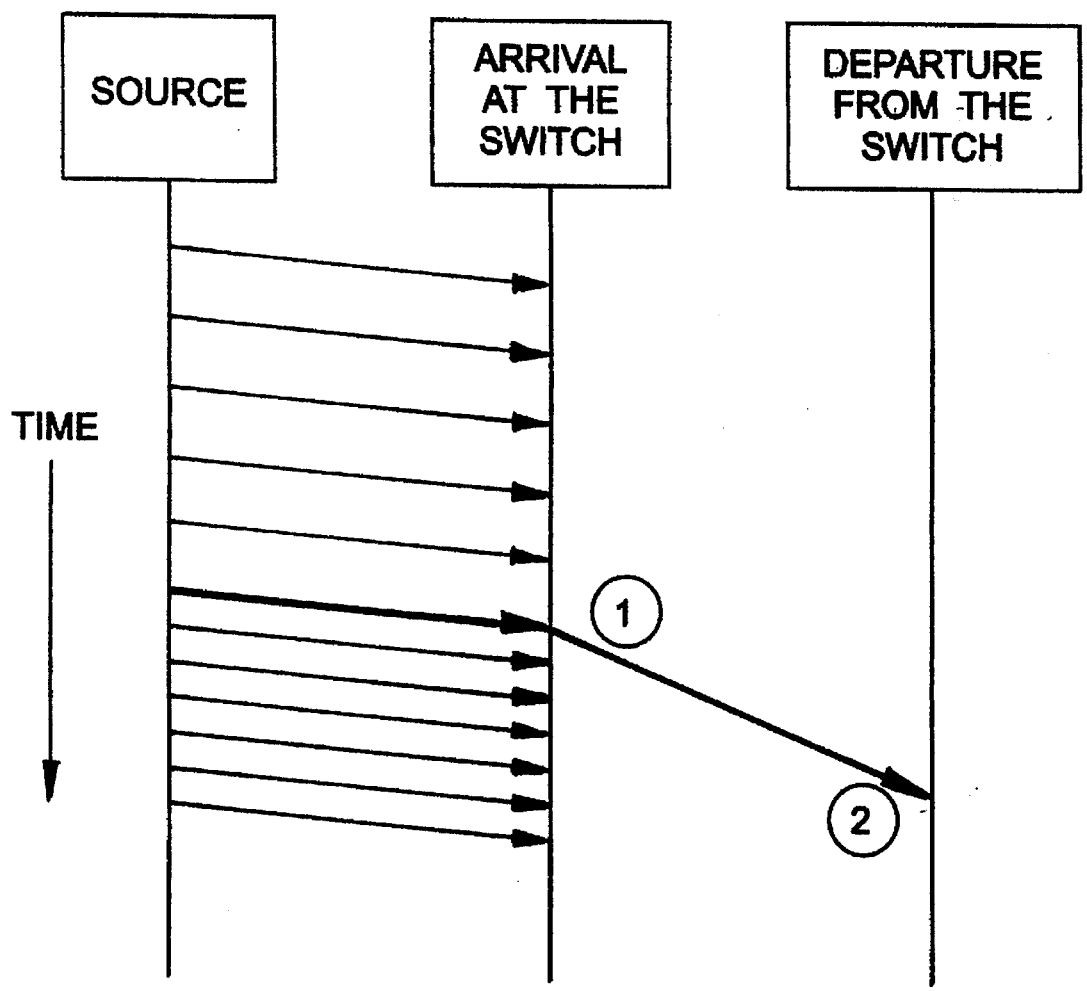
FIG. 13 is a graphic representation of the queue state of the present invention.

Under highly overloaded conditions, as those skilled in the art will appreciate, the queues in a system may become long. The control cells may remain in the system for more than one averaging interval and the question arises as to what load level value should be used for efficiency or fairness computation. Should it be the value at the time of control cell arrival or the latest value at the time of control cell departure? The correct answer is: the value at the cell arrival time should be used. This is because the queue state at arrival more accurately reflects the effect of the TCR indicated in the control cell. This is shown in FIG. 13. The queue state at time of departure depends upon the load that the source put after the control cell had left the source. This subsequent load may be very different from that indicated in the cell.

When a source first starts, it may not be provided with the averaging interval or the rate to use. However, ATM networks are connection oriented and so the above information can be obtained during connection setup. For example, the averaging interval and the initial rate may be specified in the connection accept message. Alternately, it is possible to send a control cell (with TCR=OCR=0) and wait for it to return. This will give the averaging interval. Then any initial rate may be selected and transmitting started. Use the averaging interval returned in the feedback to measure OCR and at the end of the averaging interval send a control cell containing this OCR. When the control cell returns, it will have the information to change to the correct load level.

Since the averaging intervals depend upon the path, the averaging interval may be known to the source host from other VCs going to the same destination host. Also, a network manager may hardcode the same averaging interval in all switches and hosts. This procedure, however, is not preferred since not all switches that a host may eventually use may be in the control of the network manager.

The initial transmission cell rate affects the network operation for only the first few round trips. Therefore, it can be any value below (and including) the target cell rate of the link at the source. However, network managers may set any other initial rate to avoid startup impulses.

Additionally, the most commonly used traffic pattern in congestion simulations is the so called "infinite source model." In this model, all sources have cells to send at all times. It is a good starting configuration because schemes are compared for overload and if a scheme does not work for an infinite source, it is not a good congestion scheme. In other words, satisfactory operation with infinite source model is necessary. However, it is not sufficient. We have found that many schemes work for infinite source models but fail to operate satisfactorily if the sources are bursty, which is usually the case.

The present method incorporates significant advantages over the known systems described herein. For example, 1) the bottleneck links utilization remains in the efficient region or the target utilization band (TUB) selected by the network manager. Based on the cost of the bandwidth, the network manager sets the target utilization band for each link. The target utilization affects the rate at which the queues are drained during overload. A higher target utilization reduces unused capacity but increase the time to reach the efficient region after a disturbance. A wide TUB results in a faster progress towards fairness. In most cases, a TUB of 90% (1±0.1) is a good choice. This gives a utilization in the range of 81% to 99%.

2) In the present method, once the network reaches the efficient region, the oscillations in the link utilizations are bounded to be within the TUB. In other rate-based schemes, average utilization levels as low as 30% have been observed for some WAN configurations. This is particularly bad given that WAN links are extremely expensive.

3) Under steady state, the present method operates with input rate just below the nominal capacity of the link. The queue lengths are close to zero and as a result round trip delays are close to the minimum possible.

Other rate based schemes, particularly those using queue thresholds as congestion indicators, attempt to keep the queue lengths close to the thresholds. Thereby, introducing unnecessary delay in the path.

Even the credit-based schemes keep the a certain queue length at each hop and as a result the round trip delays are generally an order of magnitude larger than the minimum.

4) The present method is a congestion avoidance scheme. A congestion avoidance scheme is one that tries to keep the network at high throughput and low delay. A simple test to see if a scheme is a congestion avoidance scheme is to see if its operating point will change as the number of buffers in the switches is increased enormously. Most congestion control schemes base their operating point on buffer availability. Therefore, the delay goes up as the buffer size is increased. Note that the credit-based scheme has this characteristics. This has the undesirable property that as the network owners put more memory resources in their network, their delay performance deteriorates. A congestion avoidance scheme's operating point does not depend upon buffers. The present method will work the same way provided the switches have reasonable amount of buffers.

In general, a properly designed rate-based scheme will be better than a credit based scheme in terms of end-to-end delay. This is because the effective rate of flow of cells belonging to a particular VC changes at every hop in credit based scheme. The cells have to be buffered at the switch because of rate variations.

5) Prior schemes use "desired cell rate" to compute the fair share. It is possible that a source may not be able to use the declared rate. The unused capacity is wasted since it is not allocated to other sources. For example, suppose a PC connected to a 155 Mbps link is not be able to transmit more than 10 Mpbs because of its hardware/software limitation. The source declares a desired rate of 155 Mbps, but is granted 77.5 Mbps since there is another VC sharing the link going out from the switch. Now if the PC is unable to use any more than 10 Mbps, the remaining 67.5 Mbps is reserved for it and cannot be used by the second VC. The link bandwidth is wasted. In the present method, the current load is measured and all unused capacity is allocated to contending sources.

6) In prior schemes the source does not transmit anything during the interval between bursts. Again the unused bandwidth cannot be allocated to other sources unless the interburst time is so large that the switch times out and allocates the bandwidth to other contending sources. In the present method, the offered cell rate is measured and, therefore, no capacity is wasted.

7) Schemes with too many parameters are difficult to use and can be easily mistuned by improper setting of these parameters. For example, in one version of PRCA, there were more than 10 parameters including the multiplicative decrease factor, additive increase rate, additive decrease rate, EFCI setting interval n, RM Cell opportunity interval, etc. In the present method, the network manager sets just three parameters: the averaging interval for switches, the target link utilization, and the half-width of the target utilization band.

8) Some prior schemes are very sensitive to the parameter value. An easy way to identify such schemes is that they recommend different parameter values for different network configurations. For example, a switch parameter may be different for wide area network (WAN) configurations than in a local area network (LAN) configuration. A switch generally has some VCs travelling short distances while others travelling long distances. While it is sufficient to classify a VC as a local or wide area VC, it is often not correct to classify a switch as a LAN switch or a WAN switch. In a nationwide internet consisting of local networks, all switches could be classified as WAN switches. The parameters of the present method do not depend upon the lengths of the link or the distances travelled by the VCs.

9) Setting the three parameters of the present method is relatively easy. The desired link utilization levels provide a tradeoff between efficiency and time to achieve fairness. High link utilizations will lead to higher queue lengths and slower progress towards fairness.

The switch averaging interval affects the stability of measured load and provides a tradeoff between oscillations and time to achieve optimality. Shorter intervals cause more variation in the measured load and hence more oscillations. Larger intervals cause slow feedback and hence slow progress towards optimality.

10) The MIT scheme requires the switches to remember the rates for all VCs and, therefore, its storage requirements as well as computation complexity is of the order of n, O(n). This makes it somewhat undesirable for large switches that may have thousands of VCs going through it at any one time. The present method does not need all the rates at the same time. Therefore, the computation of fair share is of order 1, O(1).

11) A network can provide two kinds of feedback to the sources. Positive feedback tells the sources to increase their load. Negative feedback tells the sources to decrease their load. These are called two polarities of the feedback. Some schemes are bipolar in the sense that they use both positive and negative feedback. The present method uses both polarities. The DECbit scheme is another example of a bipolar scheme.

Some schemes use only one polarity of feedback, say positive. Whenever, the sources receive the feedback, they increase the rate and when they don't receive any feedback, the network is assumed to be overloaded and the sources automatically decrease the rate without any explicit instruction from the network. Such schemes send feedback only when the network is underloaded and avoid sending feedback during overload. The PRCA scheme is an example of a unipolar scheme with positive polarity only.

Unipolar schemes with negative polarity are similarly possible. Early versions of PRCA used negative polarity in the sense that the sources increased the rate continuously unless instructed by the network to decrease. The slow start scheme used in TCP/IP is also an example of unipolar scheme with negative polarity although in this case the feedback (packet loss) is an implicit feedback (no bits or control packets are sent to the source).

The MIT scheme and its UCI modification are unipolar with only negative feedback to the source. The switches can only reduce the rate and not increase it. For increase, the source has to send another control cell with a higher desired rate. Thus, increases are delayed resulting in reduced efficiency.

The key problem with some unipolar schemes is that the load is changed continuously-often on every cell. This may not be desirable for some workloads, such as compressed video traffic. Every adjustment in rate requires the application to adjust its parameters. Bipolar schemes avoid the unnecessary adjustments by providing explicit instructions to the sources when to change the load.

One reason for preferring unipolar feedback in some cases is that the number of feedback messages is reduced.

However, this is not always true. For example, the MIT and present method have the same data cell to control cells ratio. In the MIT scheme, a second control cell has to be sent to determine the increase amount during underload. This is avoided in the present method by using a bipolar feedback.

12) Using input rates rather than queue length as the load measure is an unique design feature of the present invention. Most congestion control schemes for packet networks in the past were window based. It is rather common to take these window based control scheme and simply change windows to rate. This does not work well. In particular, a window controls the queue length, while the rate controls the queue growth rate. Given a particular window size, the maximum queue length can be guaranteed to be below the window. Given an input rate to a queue, the queue growth rate can be guaranteed below the input rate but there is nothing that can be said about the maximum queue length. Queue length gives no information about the difference between current input rate and the ideal rate.

As an example, consider two rate controlled queues. Suppose the first queue is only 10 cells long while the other is 1000 cells long. Without further information it is not possible to say which queue is overloaded. For example, if the first queue is growing at the rate of 1000 cells per second, it is overloaded while the second queue may be decreasing at a rate of 1000 cells per second and may actually be underloaded.

Any rate based scheme which uses queue threshold to control input rate is bound to be wrong. While queue length is a good load indicator for window controlled queues, queue growth rate or input rate is the correct load indicator for the rate controlled queues. Missing this fundamental point is the cause of ineffectiveness of many rate-based schemes.

Monitoring input rates not only gives a good indication of load level, it also gives a precise indication of overload or underload. For example, if the input rate to a queue is 20 cells per second when the queue server can handle only 10 cells per second, the queue overload factor is 2 and the input rate should be decreased by a factor of 2. No such determination can be made based on instantaneous queue length.

The present invention uses the input rate to compute the overload level and adjust the source rates accordingly. Each switch counts the number of cells that it received on a link in a given period, computes the cell arrival rate and hence the overload factor using the known capacity (in cells per second) of the link. It tries to adjust the source rate by a factor equal to the overload level and thus attempts to bring it down to the correct level as soon as possible.

13) One of the basic requirements of the rate-based camp at ATM forum was that the implementors don't want to use per-VC queuing or scheduling. The credit based approach is fair only if fair queuing is used at each switch. Since all cells are of the same size, fair queuing for ATM networks is equivalent to the round-robin service. The MIT and present method provide fairness with the usual first-in first out (FIFO) service.

14) One of the fundamental principles in designing a congestion control scheme (or any control scheme for that matter) is that it helps to know what value of control the feedback is related to. Forgetting this golden rule often leads to congestion control algorithms that do not work. For example, when the network tells the source that it is overloaded, it would be helpful for the source to know what was its control (load) which caused the network to get overloaded. Since the control is a dynamic quantity and there is a nonzero feedback delay, the current control may not be what the feedback is related to.

One example of violation of this rule is the proposal that the switches should put feedback in the control cells going in the reverse direction. The queue state in the switch at the time of feedback has nothing to do with the transmission rate that is indicated in the control cell.

It is to follow this rule of keeping feedback and control related that TCR and OCR are included in the control cell and that the load level is used at control cell arrival rather than at departure in computing the feedback.

15) In developing the present method, a packet train model to simulate bursty traffic was used. A packet train is basically a "burst" of k cells (probably consisting of segments of an application PDU) sent instantaneously by the host system to the adapter. In real systems, the burst is transferred to the adapter at the system bus rate which is very high and so simulating instantaneous transfers is justified. The adapter outputs all its cells at the link rate or at the rate specified by the network in case of rate feedback schemes. If the bursts are far apart, the resulting traffic on the link will look like trains of packets with a gap between trains.

The key question in simulating the train workload is what happens when the adapter queue is full? Does the source keep putting more bursts into the queue or stop putting new bursts until permitted? This is resolved in the present method by classifying the application as continuous media (video, etc) or interruptible media (data files). In a real system, continuous media cannot be interrupted and the cells will be dropped by the adapter when the network permitted rate is low. With interruptible media, the host stops generating new PDUs until permitted to do so by the adapter. We are simulating only interruptible packet trains for ABR traffic.

16) Unlike other known schemes, the present method has very few parameters. The number of parameters is low and the parameters are easy to understand, so that even unskilled network managers can set the parameters correctly. For example, the load averaging interval and the target utilization band (TUB) are conveniently set up.

The load averaging interval controls the variance in the load estimate and the time to adopt to load changes. Very small intervals can cause high variance in the estimate causing too many oscillations. However, if the load changes significantly (for example, a high bandwidth source becomes quiet), the system will become aware of the change faster. Very large intervals provide smooth estimates of the load resulting in less oscillation but the load changes will be sensed much later.

There are two characteristics of the target utilization band: the target utilization level, and the width of the TUB. For example, if the TUB is set at 90(1±0.1)%, the target utilization level is 90% and the width is 18%.

The target utilization level sets the utilization goal under overload. It controls the drain rate of the queue under overload. For example, when the target utilization is set at 90%, the switch attempts to bring the input rate down whenever it exceeds 90%. The queue is still served at 100% and the difference 10% is the rate of decrease of queue length.

The width of the TUB determines the size of the input rate oscillations under steady state. For example, with a TUB of 90(1±0.1)%, the input rate will stay between 81 to 99% of the link rate. From this point of view, the width should be small. However, the width also affect the rate at which fairness is achieved. Larger width results in fairness more quickly. Thus, the width provides a tradeoff between time to fairness and the size of the oscillations.

The scheme as described so far is the basic necessary part to achieve fairness and efficiency. Optional enhancements previously introduced in, for example FIG. 10, that improve the performance under certain circumstances are described next.

A) Aggressive Fairness Option: In the present method, when a link is outside the TUB, all input rates are adjusted simply by the load level. For example, if the load is 200%, all sources will be asked to halve their rates regardless of their relative magnitude. This is because the goal is to get into the efficient operation region as soon as possible without worrying about fairness. The fairness is achieved after the link is in the TUB.

Alternatively, we could attempt to take steps towards fairness by taking into account the current load level of the source even outside the TUB. However, one has to be careful. For example, when a link is underloaded there is no point in discouraging a source from increasing simply because it is using more than its fair share. We can't be sure that underloading sources can use the extra bandwidth and if we don't give it to a overloading (over the fair share) source, the extra bandwidth may go unused.

Referring more particularly to FIG. 14, the aggressive fairness option procedure is started (step 170) and a determination is made whether the load is greater than or equal to the upper load bound (step 172). If the load is greater than the upper load bound, a determination is made whether the OCR is less than the fair share and the number of active VCs are not equal to 1 (step 174). If the answer is "yes" at step 174, the decision is replaced with 1 (step 176) and the procedure is completed (step 200). If the answer at step 174 is "no", a determination is made whether the OCR is less than the fair share multiplied by the load level (step 178). If the answer is "yes" at step 178, the decision is replaced by the maximum or 1 or the OCR divided by the fair share (step 180) and the procedure is completed (step 200). If the answer at step 178 is "no", a determination is made whether the OCR is less than the target cell rate (step 182). If the answer is "yes" at step 182, the decision is replaced by the load level (step 184) and the procedure is completed (step 200). If, however, the answer at step 182 is "no", the decision is replaced by the load level multiplied by the OCR divided by the target cell rate (step 186) and the procedure is completed (step 200).

If the load is determined to be less than the lower load bound (step 188), the determination is made whether the OCR is less than fair share times the load level or the number of active virtual channels equals 1 (step 190). If the answer at step 190 is "yes", the load level is used as the decision (step 192) and the procedure completed (step 200). If the answer at step 190 is "no", a determination is made whether the OCR is less than the target rate multiplied by the load level (step 194). If the answer at step 194 is "yes", the decision is calculated as follows:

decision ← load level + (step 196)

$$\frac{(1 - \text{load level})}{\text{\# of active } VC - 1} \left( \frac{\text{OCR in cell}}{\text{load level} \times \text{fair share}} - 1 \right) \quad [195]$$

and the procedure completed (step 200). If the answer at step 194 is "no", the decision is replaced by 1 (step 198) and the procedure completed (step 200).

If the load is not greater than or equal to the upper load bound and not less than the lower load bound as determined at steps 172 and 188, respectively, the procedure is completed (step 200).

The aggressive fairness option is based on a number of considerations. The considerations for increase are:

1. When a link is underloaded, all of its users will be asked to increase. No one will be asked to decrease.

2. The amount of increase can be different for different sources and can depend upon their relative usage of the link.

3. The maximum allowed adjustment factor should be less than or equal to the current load level. For example, if the current load level is 50%, no source can be allowed to increase by more than a factor of 2 (which is equivalent to a load adjustment factor of 0.5).

4. The load adjustment factor should be a continuous function of the input rate. Any discontinuities will cause undesirable oscillations and impulses. For example, suppose there is a discontinuity in the curve when the input rate is 50 Mbps. Sources transmitting 50−δ Mbps (for a small δ) will get very different feedback than those transmitting at 50+δ Mbps.

5. The load adjustment factor should be a monotonically increasing function of the input rate. Again, this prevents undesirable oscillations. For example, suppose the function is not monotonic but has a peak at 50 Mbps. The sources transmitting at 50+δ Mpbs will be asked to increase more than those at 50 Mbps.

6. The new rate (input rate/load adjustment factor) should also be a continuous and monotonically increasing function of the input rate.

7. The new rate should be a continuous and monotonically decreasing function of the load level.

The corresponding considerations for overload should be obvious from the above. These are:

1. When a link is overloaded, all of its user will be asked to decrease. No one will be allowed to increase.

2. The amount of decrease can be different for different sources and can depend upon their relative usage of the link.

3. The minimum required decrease factor should be less than or equal to the current load level. For example, if the current load level is 200%, no source can be allowed to decrease by less than a factor of 2.

4. The load adjustment factor should be a continuous function of the input rate.

5. The load adjustment factor should be a monotonically increasing function of the input rate.

6. The new rate should also be a continuous and monotonically increasing function of the input rate.

7. The new rate should be a continuous and monotonically decreasing function of the load level.

It must be emphasized that the above considerations for increase and decrease apply only outside the TUB. Once inside, TUB, we violate almost all of the above except monotonicity.

Figure 15:
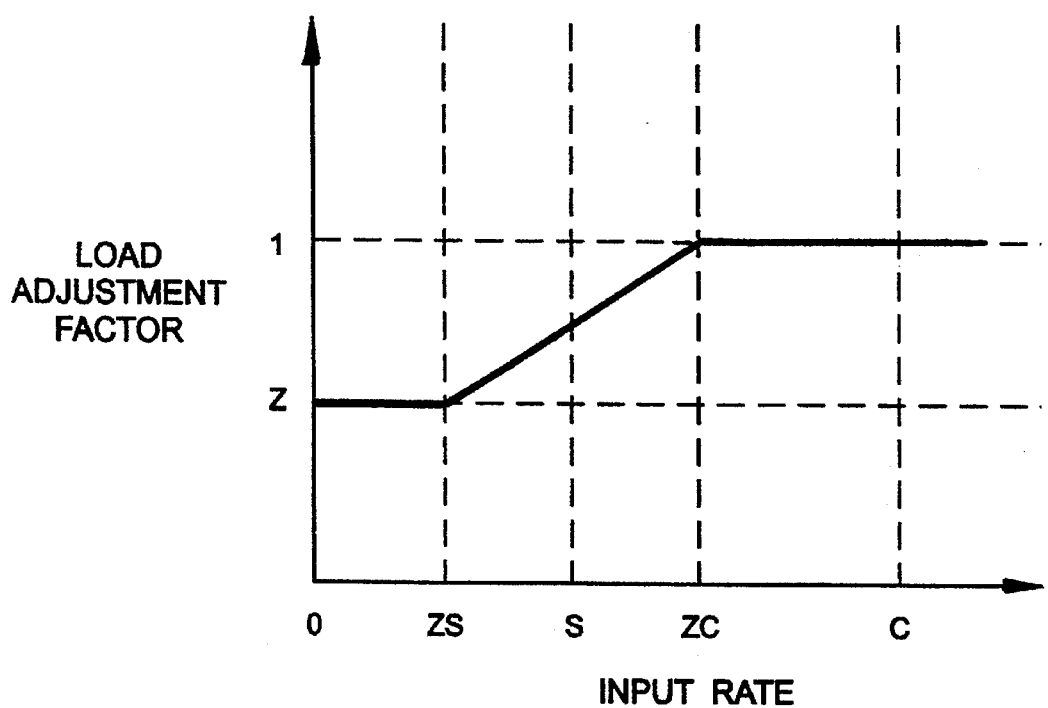
FIG. 15 is a graphic representation of the increase function for the aggressive fairness option of FIG. 14.
Figure 16:
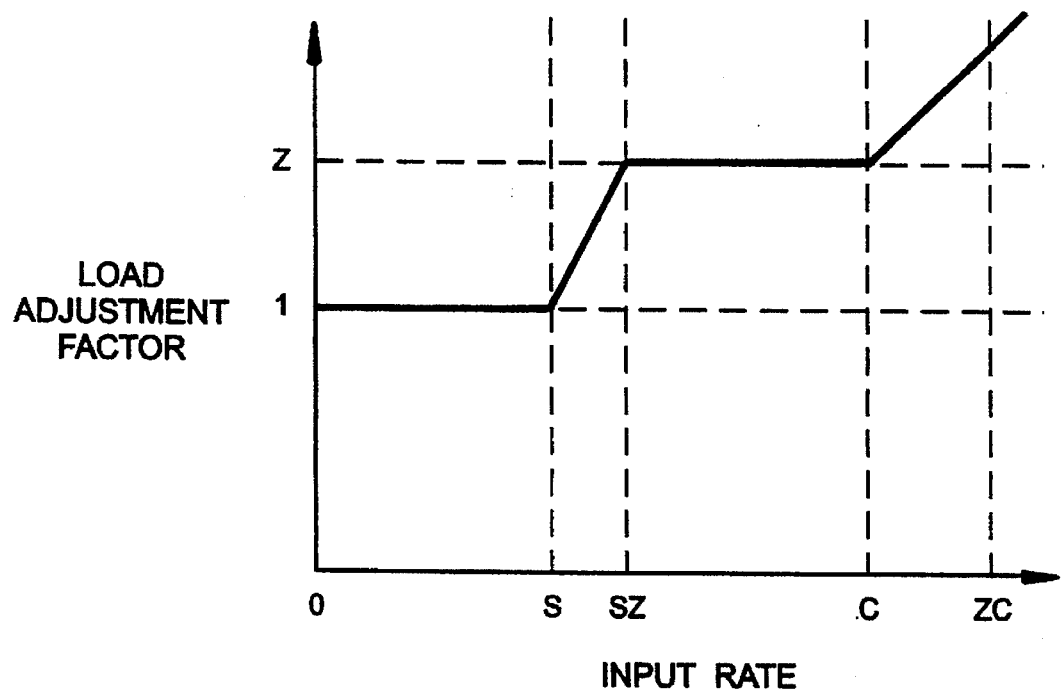
FIG. 16 is a graphic representation of the decrease function for the aggressive fairness option of FIG. 14.

A sample pair of increase and decrease functions that satisfy the above criteria are shown in FIGS. 15 and 16. The load adjustment factor is shown as a function of the input rate. To explain this graph, let us first consider the increase function shown in FIG. 15. If current load level is z, and the fair share is s, all sources with input rates below the zs are asked to increase by z. Those between zs and zc are asked to increase by an amount between z and 1.

The corresponding decrease function of FIG. 16 is used when the load level z is greater than 1. The underloading sources (input rate x<fair share) are not decreased. Those between s and sz are decreased by a linearly increasing factor between 1 and z. Those with rates between zs and c are decreased by the load level z. Those above c are decreased even more. Notice that when the load level z is 1, that is, the system is operating exactly at capacity, both the increase and decrease functions are identical (a horizontal line at load reduction factor of 1). This is important and ensures that the load adjustment factor is a continuous function of z. In designing the above function we used linear functions. However, this is not necessary. Any increasing function in place of sloping linear segments will do. The linear functions are easy to compute and provide the continuity property that we seek.

B) Precise Fairshare Computation Option: Given the actual rates of all active sources, the fair share using the method specified in FIG. 17 is calculated.

More particularly, the precise fairshare computation option is begun (step 210) and the OCR from the cell is stored into a table and the fair share is initialized to be the target cell rate divided by the number of active virtual channels (step 212). All underloaded virtual channels are located and the fair share is re-computed (step 214). A determination is then made whether the fair share was changed (step 216). If the fair share was changed, step 214 and step 216 are repeated. If the fair share was not changed, the decision is determined to be the OCR divided by the fair share (step 218). The procedure is then completed (step 220).

Thus, in place of using only the number of active VCs, the OCRs of various sources to compute the fair share could be used. This option provides a performance much better than that possible with MIT scheme because the following features that are absent in the MIT scheme:

1. Provide a bipolar feedback. The switches can increase as well as decrease the rate in the control cell. This avoids the extra round trip required for increase in the MIT scheme.

2. Measure the offered cell rate at the source and use it also to compute the fair share. Using measured value is better than using desired rates.

3. Measure actual load level at the switch. The ratio of the sum of declared OCRs and the measured input rate is used to scale the target cell rate. This helps with bursty sources. The bandwidth not used during inter-burst periods is allocated to other sources.

C) Backward Explicit Congestion Notification Option: One common criticism of end-to-end feedback control schemes is that the control is slow if the round-trip delays are large. This is particularly important for high-speed networks since the propagation delays become significant compared to the data transmission delays. One way to overcome this is for the switch to send the feedback right back to the source and thus avoiding the round-trip delay of the remaining path. Although this option, commonly known as Backward Explicit Congestion Notification (BECN) has been known for quite some time and is even allowed by the frame-relay and ATM UNI standards, no satisfactory schemes have been developed for this. This is because, most designers of the BECN have missed the key point, that correlating feedback with the correct control is the most important aspect of a congestion control scheme (and for that matter, any control system) design.

Figure 18:
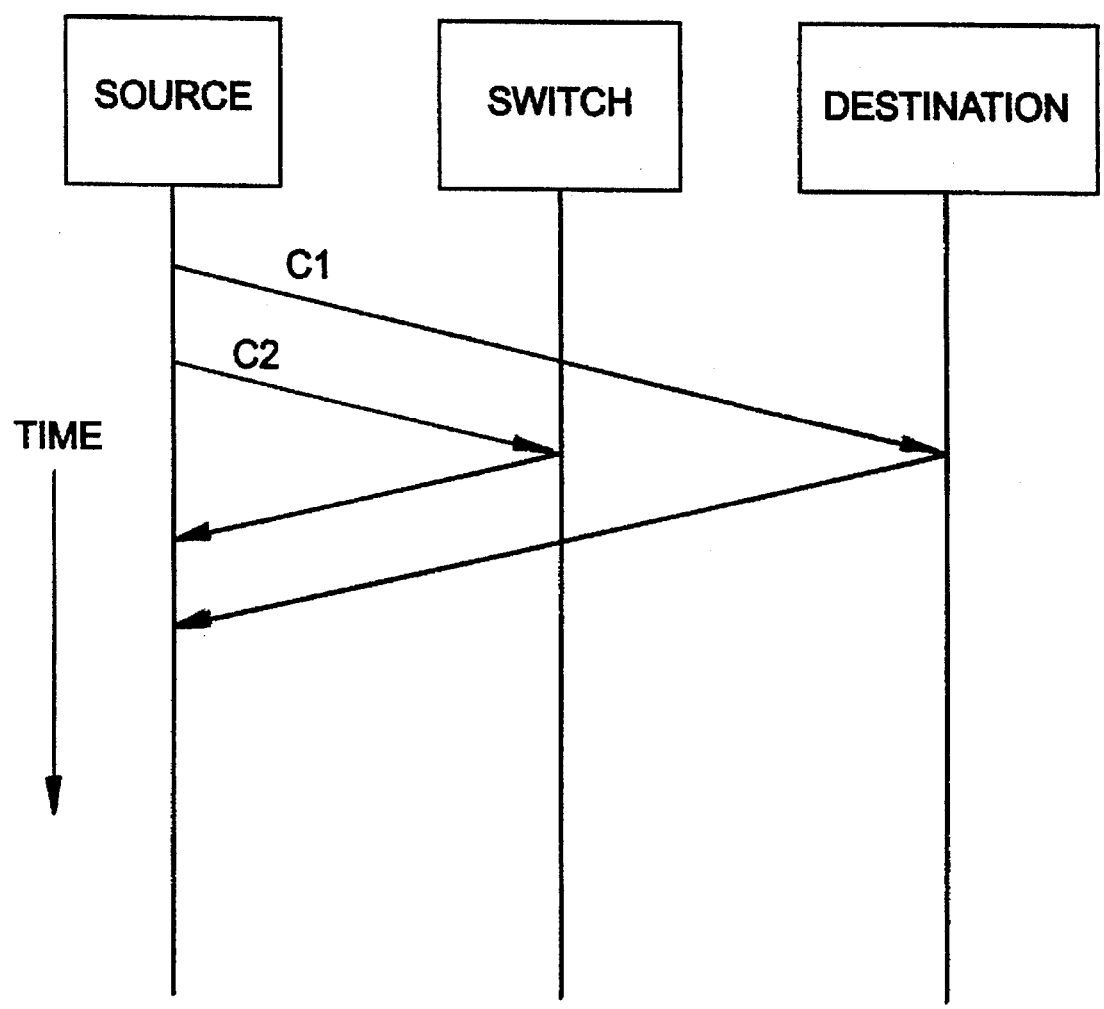
FIG. 18 is a graphic representation of the BECN feedback of the present invention; and, FIG. 19 is a graphic representation of the various components and options of the present invention.

The problem with BECN can be seen easily by the configuration of FIG. 18. The source is sending at 155 Mbps and sends a control cell. The switch happens to be unloaded at that time and so lets the first control cell go unchanged. By the time the second control cell arrives, the switch is loaded by a factor of 2 and sends a BECN to the source to come down to 77.5 Mbps. A short time later, the first control cell returns indicating to the source that the rate of 155 Mbps is satisfactory. The control cell are received out of order rendering the BECN ineffective.

To ensure correct operation for BECN, we have set up the following rules for using the BECN option of the present invention:

1. The BECN should be sent only when a switch is overloaded AND the switch wants to decrease the rate below that indicated in the load adjustment factor field of the control cell. There is no need to send BECN if the switch is underloaded. This avoids the problem of one switch asking a source to go up and a subsequent switch asking it to go down. Similarly, there is no need to confuse the source if the switch can only allow a load adjustment factor lower than that indicated in the control cell.

2. The source should include a timestamp in the control cell indicating the time when the control cell was generated. This helps distinguish successive cells. The timestamp is ignored at all intermediate switches and the destination and is used only at the source. Thus, no clock synchronization among nodes is required or assumed.

3. All control cells complete a round-trip. If a switch wants to send a BECN, it waits until it receives a control cell. It makes two copies of it. One copy is forwarded in the forward direction. The other is sent back to the source.

4. The control cell also includes a bit called "BECN bit." This bit is initialized to zero at the source and is set by the congested switch in the copy of control cell that is sent backward. This helps the source know whether a received control cell has visited the complete path or only a part of it. The cells that have completed only a part of the path are called "BECN cells" as opposed to "FECN cells" that have completed the entire path.

5. The source remembers the timestamp of the last BECN or FECN cell that it has acted upon in a variable called "Time already acted (Taa)." If the timestamp in an returned control (BECN or FECN) cell is less than Taa, the cell is ignored. This rule helps avoid out-of-order control cells.

6. If the timestamp of a control cell received at the source is equal to or greater than Taa, the new value of TCR is computed:

New TCR=TCR/Load adjustment factor and the transmission rate is adjusted as shown in Table 1.

TABLE 1

| | Source Behavior on Receiving a control cell with Timestamp $\geq$ Taa | |
|---|---|---|
| | BECN | FECN |
| TCR < New TCR | Ignore | TCR ← New TCR |
| TCR $\geq$ New TCR | TCR ← New TCR | TCR ← New TCR |

The four cases are:

(a) BECN Cell Granting Increase: This happens if the new TCR is more than the current TCR. Ignore this cell. In other words, a BECN cell cannot result in a rate increase. The rate increase has to wait until the corresponding FECN cell returns.

(b) BECN Cell Requesting Decrease: Comply. The TCR is decreased to the new TCR in the cell.

(c) FECN Cell Granting Increase: Comply. The TCR is increased to the new TCR.

(d) FECN Cell Requesting Decrease: Comply. The TCR is decreased to the new TCR.

With above rules, the BECN option of the present method reduces the time to reach the efficiency zone. The reduction is significant only in those WAN cases where the remaining path length is large.

One obvious disadvantage of the BECN scheme is that the number of control cells that are sent back to the source are increased. Also, since BECN does not have any significant effect in the LAN environment, we recommend its use only in large WANs.

Figure 19:
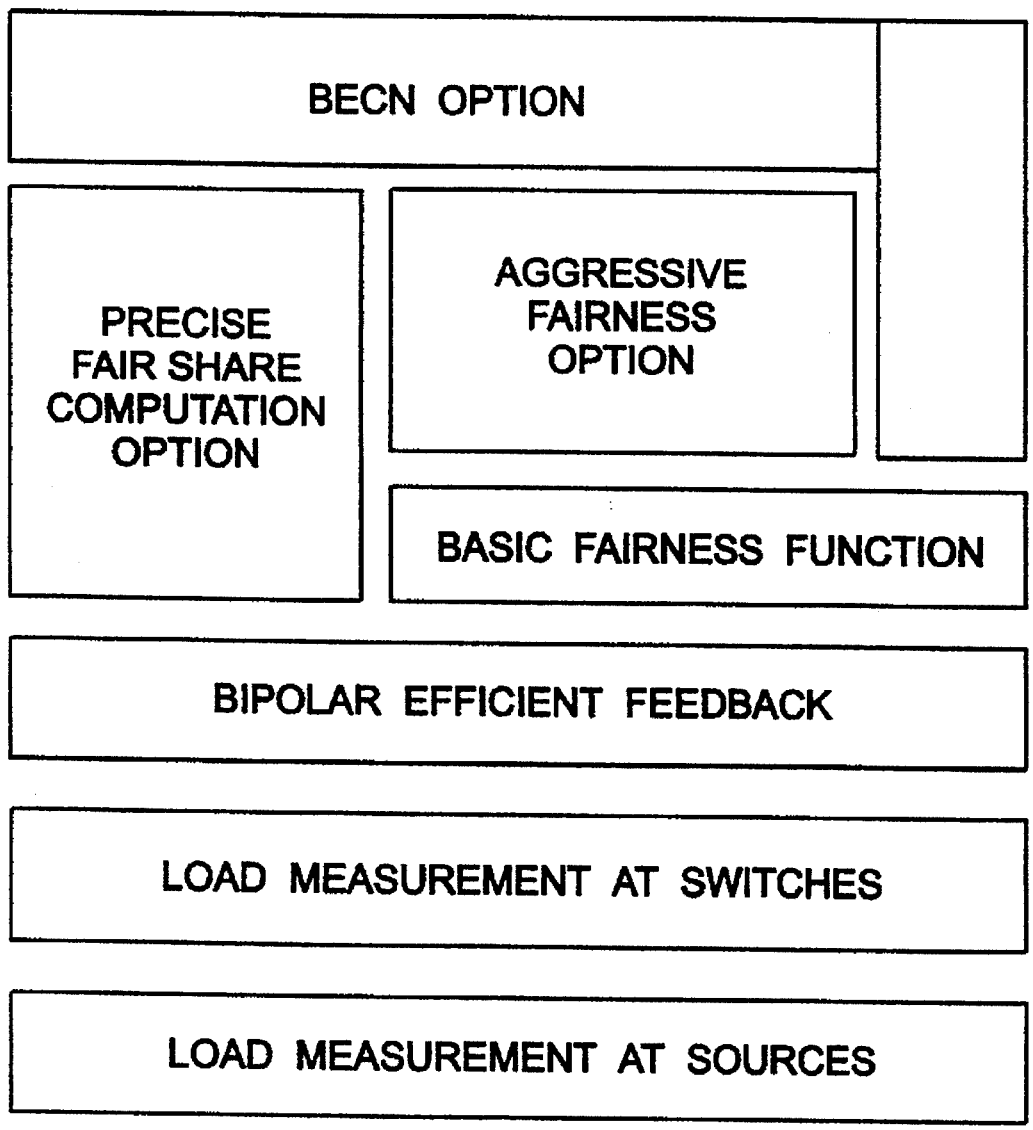

A complete layered view of various components of the present method is shown in FIG. 19. The minimum needed for correct operation is the fairness algorithm. The aggressive fairness option allows fairness to be achieved faster. The precise fairshare computation option allows both fairness and efficiency to be achieved quickly but requires the switches to use all declared OCRs in computing the fair share. The BECN option helps reduce the feedback delay in large WAN cases. As shown in FIG. 19, these options can be used individually or in a layered manner.

Those skilled in the art will appreciate that, upon review of FIGS. 9–12, 14 and 17, the events at the switch and the actions to be taken on these events are described in the following pseudocode:

```
1.  Initialization:

Target_Cell_Rate  <--  Link_Bandwidth x Target_Utilization/Cell_Size;

Target_Cell_Count <--  Target_Cell_Rate x Averaging_Interval;

Received_Cell_Count <-- 0;
        Clear VC_Seen_Bit for all VCs;
        IF (Basic_Fairness_Option OR Aggressive_Fairness_Option)
        THEN BEGIN Upper_Load_Bound <--  1 + Half_Width_Of-TUB;

Lower_Load_Bound <--  1 - Half_Width_Of-TUB;
        END;
2.  A data cell is received.
    Increment Received_Cell_Count;
    Mark VC_Seen_Bit for the VC in the Cell;
3.  The averaging interval timer expires.

Num_Active VCs  <--  Σ VC_Seen_Bit;

Fair_Share_Rate <--  Target_Cell_Rate/Num_Active_VCs;

Load_Level <--  Received_Cell_Count/Target_Cell_Count;
        Reset all VC_Seen_Bits;

Received_Cell_Count <-- 0;
        Restart Averaging_Interval_Timer;
4.  A control cell is received.
    IF (Basic_Fairness_Option)
    THEN IF (Load_Level ≥ Lower_Load_Bound) and (Load_Level ≤ Upper_Load_Bound)
        THEN BEGIN
            IF OCR_IN_CELL > Fair_Share_Rate THEN Load_Adjustment_Decision <--  Load_Level/Lower_Load_Bound ELSE Load_Adjustment_Decision <--  Load_Level/Upper_Load_Bound
        END (*IF*)

ELSE Load_Adjustment_Decision <--  Load_Level;
    IF (Aggressive_Fairness_Option)
        THEN BEGIN Load_Adjustment_Decision <--  1;
            IF (Load_Level < Lower_Load_Bound)
                THEN IF ((OCR_In_Cell < Fair_Share_Rate x Load_Level) OR
                    (Num_VC_Active = 1))

THEN Load_Adjustment_Decision <--  Load_Level
                    ELSE IF (OCR_In_Cell < Target_Cell_Rate x Load_Level)

THEN Load Adjustment Decision <--  Load_Level +
                        (1-Load-Level)x
                            (OCR_In_Cell/(Load_Level x Fair_Share) - 1/
                            (Num_VC_Active - 1)

ELSE Load_Adjustment_Decision <--  1
            ELSE IF Load_Level ≥ Upper_Load_Bound
                THEN IF (OCR_In_Cell ≤ Fair_Share_Rate AND
                    Num_Active_VCs ≠ 1)

THEN Load_Adjustment_Decision <--  1
                    ELSE IF (OCR_In_Cell < Fair_Share_Rate
                    x Load_Level)

THEN Load_Adjustment_Decision <--  max{1,
                        OCR_In_Cell/Fair_Share_Rate}
                        ELSE IF (OCR_In_Cell ≤ Target_Cell_Rate)
```

-continued

```
            THEN Load_Adjustment_Decision <- -
                 Load_Level

ELSE Load_Adjustment_Decision <- -
                 OCR_In_Cell x Load_Level/
                 Target_Cell_Rate;
END (*of Aggressive Fairness Option*)
IF (*Precise_Fairshare_Computation_Option*)
BEGIN Num_VC_Underloading <- - 0;

OCR_Of_VC_In_Table <- - OCR_In_Cell;

Fair_Share_Rate <- -  Modified_Target_Cell_Rate/Num_VC_Active;
      REPEAT
            FOR each VC seen in the Last interval DO
            IF (OCR_In_Cell < Fair_Share_Rate)
            THEN BEGIN
                 Increment Num_VC_Underloading;

Sum_OCR_Underloading <- -  Sum_OCR_Underloading + OCR_Of_VC
            END (*IF*)

Fair_Share_Rate <- - (_Target_Cell_Rate - SUM_OCR_Underloading)
            /(Num_VC_Active - Num_VC_Underloading)
      UNTIL Fair_Share_Rate does not change (*Maximum of 2 iterations*)

Load_Adjustment_Decision <- -  OCR_In_Cell/Fair_Share_Rate;
END; (*Precise Fairness Computation Option*)
IF (Load_Adjustment_Decision > Load_Adjustment_Factor_In_Cell)
THEN BEGIN Load_Adjustment_Factor_In_Cell <- - Load_Adjustment_Decision;
      IF BECN_Option and Load_Adjustment_Decision > 1
      THEN SEND_A_COPY_OF_CONTROL_CELL_BACK_TO_SOURCE;
END (*IF*)
```

Some further variations of the present method are:

1. The source offered cell rate is measured at the entry switch rather than at the source. This option may be preferable for policing and for operation in public network environments where a sources' measurements cannot be trusted.

2. The offered cell rate of a VC is measured at every switch. This is unnecessary since the average rate of a VC should not change from switch to switch. This may be used only if the VC crosses many ATM networks under different administrative domains.

3. Use multiplicative load adjustment factors instead of divisors.

4. Use dynamic averaging intervals. The averaging interval at the switch and the source are kept constant in the present method. It is possible to use regeneration intervals as the averaging interval as was done in the DECbit scheme [6]. However, our experience with DECbit scheme was that implementors didn't like the regeneration interval and queue length averaging because of the number of instructions required in the packet forwarding path.

5. Use cell counts rather than cell rates. Since the averaging interval is constant, the cell rates are proportional to the counts.

In summary, the present invention is directed to an end-to-end rate based congestion management method for computer networks in general and for ABR traffic on ATM networks in particular. In the scheme, the sources periodically send control cells containing the measured offered cell rate. The switches also measure the usage of links and allocate all unused bandwidth fairly among the contending ABR sources. A simple fairness procedure using only the number of active sources is the minimum required component. The basic scheme performs very well for bursty sources and takes the network to max-min optimal. It is a congestion avoidance scheme in the sense that it provides maximum throughput and minimal delay and is therefore ideally suited if weakly delay-sensitive video traffic is sent using ABR connections. The scheme has been designed with minimal number of parameters that can be easily set.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

Having thus described the invention, we claim:

1. A method adaptable for use in a computer network having at least one source and at least one destination between which data is transferred via a switch, the method comprising steps of:

determining the actual load level of the switch;

receiving a control cell from the source in the switch, the control cell including a first load adjustment factor and being transmitted from the source at a first transmission rate;

determining a second load adjustment factor in accordance with the current load level and a first load adjustment factor;

sending the control cell including the second load adjustment factor to at least one of the source and the destination;

receiving the control cell at the at least one of the source and the destination;

sending the control cell to the source by the destination if received at the destination; and, selectively adjusting the first transmission rate of the source to a second transmission rate in accordance with the second load adjustment factor.

2. The method according to claim 1 wherein the adjusting is accomplished using backward explicit congestion notification.

3. The method according to claim 2 further comprising providing a timestamp to the control cell to indicate when the control cell was generated.

4. The method according to claim 3 further comprising ignoring the control cell based on a value of the timestamp.

5. The method according to claim 2 wherein the sending of the control cell to the source from the switch only occurs if the switch is overloaded.

6. The method according to claim 1 wherein the adjusting is accomplished using forward explicit congestion notification.

7. The method according to claim 1 further comprising adjusting the second load adjustment in the switch in accordance with a determination of a fair share allocated to a flow based on a target cell rate and a number of active sources in the network.

8. The method according to claim 1 wherein the selectively adjusting comprises determining whether the first transmission rate or the second transmission rate is used by the source in accordance with at least one of whether the second load adjustment factor is greater than or equal to one and whether the second transmission rate is less than the first transmission rate.

9. A method for controlling an end system transmitting data at a first transmission rate in a network having a switch through which data is transferred, the method comprising steps of:

receiving a control cell from the switch, the control cell including a load adjustment factor determined in accordance with an actual load of the switch;

determining a second transmission rate based on the first transmission rate and the load adjustment factor;

selectively adjusting the end system to transmit data at the second transmission rate if the load adjustment factor is 1) greater than or equal to one and the second transmission rate is less than the first transmission rate, or 2) less than one and the second transmission rate is greater than the first transmission rate.

10. The method according to claim 9 further comprising determining an average rate and an instantaneous rate of the end system.

11. A method for controlling an end system having a first transmission rate in a network having a switch through which data is transferred, the method comprising steps of:

receiving a control cell from the switch, the control cell including a load adjustment factor determined in accordance with an actual load of the switch and a time stamp indicating when the control cell was generated;

determining a second transmission rate based on the first transmission rate and the load adjustment factor;

selectively adjusting the end system to transmit the data at the second transmission rate if the load adjustment factor is greater than or equal to one and the second transmission rate is less than the first transmission rate.

12. The method according to claim 11 further comprising determining whether the time stamp is greater than or equal to a stored time stamp representing a most recent control cell acted upon to decrease transmission rate and performing the determining and the selectively adjusting only if the time stamp is greater than or equal to the stored time stamp.

13. A method for controlling a switch in a computer network operating in a utilization band and having at least two end systems, a first end system having an average rate of data transmission, the method comprising steps of:

determining the actual load level of the switch;

receiving a control cell from the first end system, the control cell including a first load adjustment factor;

selectively determining a second load adjustment factor in accordance with the load level and the first load adjustment factor;

sending the control cell including the first load adjustment factor to a second end system if the first load adjustment factor is greater than or equal to the second load adjustment factor;

sending the control cell including the second load adjustment factor to the second end system if the second load adjustment factor is greater than the first load adjustment factor.

14. The method according to claim 13 further comprising sending the control cell including the second load adjustment factor to the source if the second load adjustment factor is greater than the first load adjustment factor, a backward explicit congestion notification option is present, and the second load adjustment factor is greater than one.

15. The method according to claim 13 further comprising:

determining a target rate of transmission;

determining a total number of active source end systems;

determining a fair share rate for each source end system based on the target rate and the total number of active source end systems, wherein selectively determining the second load adjustment factor comprises selecting the load level as the second load adjustment factor if the network is not operating within a predetermined target utilization band, selecting the load level divided by a number greater than one as the second load adjustment factor if the network is operating in the target utilization band and the average rate is less than or equal to the fair share rate, and selecting the load level divided by a second number less than one as the second load adjustment factor if the network is operating in the target utilization band and the average rate is greater than the fair share rate.

16. The method according to claim 15 further comprising selecting a target level less than one to be used to determine transmission rate.

17. The method according to claim 13 further comprising:

determining a target rate;

determining a total number of active virtual channels;

determining a total number of active source end systems;

determining a fairshare rate for each source end system based on the target rate and the total number of active source end systems;

determining whether the load level is greater than or equal to an upper load bound;

determining whether a load level is less than a lower load bound;

wherein if the load level is greater than or equal to the upper load bound, the selectively determining comprises selecting one as the second load adjustment factor if the average rate is less than the fairshare rate and the number of active virtual channels is not equal to one, selecting a maximum of one and the average rate divided by the fairshare rate as the second load adjustment level if 1) the average rate is greater than or equal to the fair share rate or the number of active virtual channels is equal to one and 2) the average rate is less than the fair share rate multiplied by the load level, selecting the load level to be the second load adjustment factor 1) if the average rate is greater than the fair share rate or the number of active virtual channels is equal to one, 2) if the average rate is greater than or equal to the fair share rate multiplied by the load level and 3) if the average rate is less than the target cell rate, selecting the load level multiplied by the average rate divided by the target cell rate 1) if the average rate is greater than or equal to the fair share rate or the number of active virtual channels equals one, 2) if the average rate is greater than or equal to the fair share rate multiplied by the load level and 3) if the average rate is greater than or equal to the target cell rate, and wherein if the load level is less than the lower load bound, the selectively determining comprises selecting the load level as the second load adjustment factor if 1) the average rate is less than the fair share multiplied by the load level or 2) the number of active virtual channels equals one, selecting the second load adjustment factor based on the average rate, the load level, and the total number of active virtual channels 1) if the average rate is less than the target cell rate multiplied by the load level, 2) if the average rate is greater than or equal to the fair share rate multiplied by the load level and 3) if the number of active virtual channels is not equal to one, selecting one as the second load adjustment factor 1) if the average rate is greater than or equal to the target rate multiplied by the load level, 2) if the average rate is greater than or equal to the fair share rate multiplied by the load level and 3) if the number of active virtual channels does not equal one.

18. The method according to claim 13 further comprising:
determining a target rate;
determining a total number of active source end systems;
determining a fair share rate for each source end system based on the target rate and the total number of active source end systems;
determining a total number of underloaded virtual channels; and,
recomputing the fair share rate,
wherein the selectively determining comprises selecting the average rate divided by the fair share rate as the second load adjustment factor if the fair share rate is constant.

19. An apparatus in a computer network having at least one source and at least one destination between which data is transferred via a switch, the apparatus comprising:
means for determining the actual load level of the switch;
means for receiving a control cell from the source in the switch, the control cell including a first load adjustment factor and being transmitted from the source at a first transmission rate;
means for determining a second load adjustment factor in accordance with the current load level and a first load adjustment factor;
means for sending the control cell including the second load adjustment factor to at least one of the source and the destination;
means for receiving the control cell at the at least one of the source and the destination;
means for sending the control cell to the source by the destination if received at the destination; and,
means for selectively adjusting the first transmission rate of the source to a second transmission rate in accordance with the second load adjustment factor.

20. The apparatus according to claim 19 wherein the means adjusting includes means for using backward explicit congestion notification.

21. The apparatus according to claim 19 further comprising a timestamp in the control cell to indicate when the control cell was generated.

22. The apparatus according to claim 21 further comprising means for ignoring the control cell based on a value of the timestamp.

23. The apparatus according to claim 20 further comprising:
means for determining whether the switch is overloaded,
wherein the means for sending the control cell to the source from the switch includes means for sending the control cell to the source only if the switch is overloaded.

24. The apparatus according to claim 19 wherein the means for adjusting includes means for using forward explicit congestion notification.

25. The apparatus according to claim 19 further comprising means for adjusting the second load adjustment in the switch in accordance with a determination of a fair share allocated to a flow based on a target cell rate and a number of active sources in the network.

26. The apparatus according to claim 19 wherein the means for selectively adjusting comprises means for determining whether the first transmission rate or the second transmission rate is used by the source in accordance with at least one of whether the second load adjustment factor is greater than or equal to one and whether the second transmission rate is less than the first transmission rate.

27. An apparatus for controlling an end system having a first transmission rate in a network having a switch through which data is transferred, the apparatus comprising:
means for receiving a control cell from the switch, the control cell including a load adjustment factor determined in accordance with an actual load of the switch;
means for determining a second transmission rate based on the first transmission rate and the load adjustment factor;
means for selectively adjusting the end system to transmit data at the second transmission rate if the load adjustment factor is 1) greater than or equal to one and the second transmission rate is less than the first transmission rate, or 2) less than one and the second transmission rate is greater than the first transmission rate.

28. The apparatus according to claim 27 further comprising means for determining an average rate and an instantaneous rate of the end system.

29. An apparatus for controlling an end system having a first transmission rate in a network having a switch through which data is transferred, the apparatus comprising:
means for receiving a control cell from the switch, the control cell including a load adjustment factor determined in accordance with an actual load of the switch and a time stamp indicating when the control cell was generated;

means for determining a second transmission rate based on the first transmission rate and the load adjustment factor;

means for selectively adjusting the end system to transmit the data at the second transmission rate if the load adjustment factor is greater than or equal to one and the second transmission rate is less than the first transmission rate.

30. The apparatus according to claim 29 further comprising means for determining whether the time stamp is greater than or equal to a stored time stamp representing a most recent control cell acted upon to decrease transmission rate and means for performing the determining and the selectively adjusting only if the time stamp is greater than or equal to the stored time stamp.

31. An apparatus for controlling a switch in a computer network operating in a utilization band and having at least two end systems, a first end system having an average rate of data transmission, the apparatus comprising:

means for determining the actual load level of the switch;

means for receiving a control cell from the first end system, the control cell including a first load adjustment factor;

means for selectively determining a second load adjustment factor in accordance with the load level and the first load adjustment factor;

means for sending the control cell including the first load adjustment factor to a second end system if the first load adjustment factor is greater than or equal to the second load adjustment factor;

means for sending the control cell including the second load adjustment factor to the second end system if the second load adjustment factor is greater than the first load adjustment factor.

32. The apparatus according to claim 31 further comprising means for sending the control cell including the second load adjustment factor to the source if the second load adjustment factor is greater than the first load adjustment factor, a backward explicit congestion notification option is present, and the second load adjustment factor is greater than one.

33. The apparatus according to claim 13 further comprising:

means for determining a target rate of transmission;

means for determining a total number of active source end systems;

means for determining a fair share rate for each source end system based on the target rate and the total number of active source end systems, wherein the means for selectively determining the second load adjustment factor comprises means for selecting the load level as the second load adjustment factor if the network is not operating within a predetermined target utilization band, means for selecting the load level divided by a number greater than one as the second load adjustment factor if the network is operating in the target utilization band and the average rate is less than or equal to the fair share rate, and means for selecting the load level divided by a second number less than one as the second load adjustment factor if the network is operating in the target utilization band and the average rate is greater than the fair share rate.

34. The apparatus according to claim 33 further comprising means for selecting a target level less than one to be used to determine transmission rate.

35. The apparatus according to claim 31 further comprising:

means for determining a target rate;

means for determining a total number of active virtual channels;

means for determining a total number of active source end systems;

means for determining a fairshare rate for each source end system based on the target rate and the total number of active source end systems;

means for determining whether the load level is greater than or equal to an upper load bound;

means for determining whether a load level is less than a lower load bound;

wherein if the load level is greater than or equal to an upper load bound, the means for selectively determining includes means for:

selecting one as the second load adjustment factor if the average rate is less than the fairshare rate and the number of active virtual channels is not equal to one, selecting a maximum of one and the average rate divided by the fairshare rate as the second load adjustment level if 1) the average rate is greater than or equal to the fair share rate or the number of active virtual channels is equal to one and 2) the average rate is less than the fair share rate multiplied by the load level, selecting the load level to be the second load adjustment factor 1) if the average rate is greater than the fair share rate or the number of active virtual channels is equal to one, 2) if the average rate is greater than or equal to the fair share rate multiplied by the load level and 3) if the average rate is less than the target cell rate, selecting the load level multiplied by the average rate divided by the target cell rate 1) if the average rate is greater than or equal to the fair share rate or the number of active virtual channels equals one, 2) if the average rate is greater than or equal to the fair share rate multiplied by the load level and 3) if the average rate is greater than or equal to the target cell rate, and wherein the load level is less than the lower load bound, the means for selectively determining includes means for:

selecting the load level as the second load adjustment factor if 1) the average rate is less than the fair share multiplied by the load level or 2) the number of active virtual channels equals one, selecting the second load adjustment factor based on the average rate, the load level, and the total number of active virtual channels 1) if the average rate is less than the target cell rate multiplied by the load level, 2) if the average rate is greater than or equal to the fair share rate multiplied by the load level and 3) the number of active virtual channels is not equal to one, selecting one as the second load adjustment factor 1) if the average rate is greater than or equal to the target rate multiplied by the load level, 2) if the average rate is greater than or equal to the fair share rate multiplied by the load level 3) if the number of active virtual channels does not equal one.

36. The apparatus according to claim 31 further comprising:

means for determining a target rate;

means for determining a total number of active source end systems;

means for determining a fair share rate for each source end system based on the target rate and the total number of active source end systems;

means for determining underloaded virtual channels; and, means for recomputing the fair share rate, wherein the means for selectively determining includes means for selecting the average rate divided by the fair share rate as the second load adjustment factor if the fair share rate is constant.

* * * * *